US012214515B2

(12) United States Patent
Zucker

(10) Patent No.: US 12,214,515 B2
(45) **Date of Patent: *Feb. 4, 2025**

(54) RAZOR CARTRIDGE

(71) Applicant: Dollar Shave Club, Inc., Marina del Rey, CA (US)

(72) Inventor: Shlomo Zucker, Mihmoret (IL)

(73) Assignee: Dollar Shave Club, Inc., Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,253

(22) Filed: Jul. 27, 2023

(65) Prior Publication Data

US 2023/0364817 A1 Nov. 16, 2023

Related U.S. Application Data

(63) Continuation of application No. 17/672,679, filed on Feb. 15, 2022, now Pat. No. 11,745,371, which is a continuation of application No. 16/663,318, filed on Oct. 24, 2019, now Pat. No. 11,298,845, which is a continuation of application No. 15/977,964, filed on May 11, 2018, now Pat. No. 10,569,435, which is a (Continued)

(51) Int. Cl.

*B26B 21/52* (2006.01)
*B26B 21/22* (2006.01)
*B26B 21/40* (2006.01)
*B26B 21/44* (2006.01)

(52) U.S. Cl.

CPC .......... *B26B 21/521* (2013.01); *B26B 21/225* (2013.01); *B26B 21/4062* (2013.01); *B26B 21/443* (2013.01)

(58) Field of Classification Search

CPC ... B26B 21/521; B26B 21/443; B26B 21/225; B26B 21/4062; B26B 21/22; B26B 21/14

USPC ........................................ 30/47–51, 526–536

See application file for complete search history.

(56) References Cited

U.S. PATENT DOCUMENTS 2,138,353 A 11/1938 Victor et al.
3,934,339 A 1/1976 Dawidowicz et al.

(Continued)

FOREIGN PATENT DOCUMENTS

CN 203611269 U 5/2014
CN 104853887 A 8/2015

(Continued)

OTHER PUBLICATIONS

Magana S.E., et al., "Fluorescence Spectra of Colored Diamonds Using A Rapid, Mobile Spectrometer," Gems and Gemology, Los Angeles, CA, US, Jan. 1, 2007, vol. 43, No. 4, pp. 332-351, DOI:10.5741/GEMS.43.4.332, ISSN 0016-626X, XP055697300.

*Primary Examiner* — Nhat Chieu Q Do

(74) *Attorney, Agent, or Firm* — DLA Piper LLP (US)

(57) ABSTRACT

A shaving razor system includes a razor handle that docks with a razor cartridge. The handle is configured to dock with the razor cartridge using a single hook configured to mate with a cartridge tab. A central pushrod is mounted with a spring into the handle and is configured to exert a pushing force on the mounted cartridge. To eject the cartridge, the single hook may be pushed to pivot to the side of the cartridge tab, and thereby release the razor cartridge by ejecting it with the spring loaded pushrod.

9 Claims, 20 Drawing Sheets

Related U.S. Application Data continuation of application No. 15/380,760, filed on Dec. 15, 2016, now Pat. No. 9,993,931.

(60) Provisional application No. 62/425,820, filed on Nov. 23, 2016.

(56) References Cited

U.S. PATENT DOCUMENTS 3,938,247 A 2/1976 Carbonell et al.
3,964,159 A 6/1976 Ferraro
4,016,648 A 4/1977 Chen et al.
4,026,016 A 5/1977 Nissen
4,057,896 A 11/1977 Trotta
4,063,354 A 12/1977 Oldroyd et al.
4,063,357 A 12/1977 Francis
4,083,104 A 4/1978 Nissen et al.
4,084,316 A 4/1978 Francis
4,094,063 A 6/1978 Trotta
4,168,571 A 9/1979 Francis
4,180,907 A 1/1980 Iten
4,198,746 A 4/1980 Trotta
4,200,976 A 5/1980 Gooding
4,247,982 A 2/1981 Booth et al.
4,253,235 A 3/1981 Jacobson
4,253,236 A 3/1981 Jacobson
4,253,237 A 3/1981 Jacobson
4,257,160 A 3/1981 Murai
4,258,471 A 3/1981 Jacobson
4,265,015 A 5/1981 Asano
4,266,340 A 5/1981 Bowman
4,270,268 A 6/1981 Jacobson
4,272,885 A 6/1981 Ferraro
4,275,498 A 6/1981 Ciaffone
4,281,454 A 8/1981 Trotta
4,281,456 A 8/1981 Douglass et al.
4,282,650 A 8/1981 Trotta
4,282,651 A 8/1981 Trotta
4,283,850 A 8/1981 Douglass et al.
4,288,920 A 9/1981 Douglass et al.
4,300,285 A 11/1981 Endo
4,302,876 A 12/1981 Emmett
4,308,663 A 1/1982 Ciaffone
4,309,821 A 1/1982 Terry et al.
4,324,041 A 4/1982 Trotta
4,335,508 A 6/1982 Francis et al.
4,337,575 A 7/1982 Trotta
4,345,374 A 8/1982 Jacobson
4,354,312 A 10/1982 Trotta
4,378,633 A 4/1983 Jacobson
4,378,634 A 4/1983 Jacobson
4,389,773 A 6/1983 Nissen et al.
4,392,303 A 7/1983 Ciaffone
4,395,822 A 8/1983 Ciaffone
4,403,412 A 9/1983 Trotta
4,403,413 A 9/1983 Trotta
4,403,414 A 9/1983 Kiraly et al.
4,407,067 A 10/1983 Trotta
4,411,065 A 10/1983 Trotta
4,413,411 A 11/1983 Trotta
4,422,237 A 12/1983 Trotta
4,428,116 A 1/1984 Chen et al.
4,442,598 A 4/1984 Jacobson
4,443,940 A 4/1984 Francis et al.
4,446,619 A 5/1984 Jacobson
4,486,952 A 12/1984 Trotta
4,488,357 A 12/1984 Jacobson
4,492,024 A 1/1985 Jacobson
4,492,025 A 1/1985 Jacobson
4,498,235 A 2/1985 Jacobson
4,514,904 A 5/1985 Bond
4,551,916 A 11/1985 Jacobson
4,573,266 A 3/1986 Jacobson
4,574,476 A 3/1986 Ortiz
4,586,255 A 5/1986 Jacobson
4,587,729 A 5/1986 Jacobson
4,599,793 A 7/1986 Iten
4,621,424 A 11/1986 Jacobson
4,739,553 A 4/1988 Lazarchik
4,785,534 A 11/1988 Lazarchik
4,797,998 A * 1/1989 Motta .................. B26B 21/225
30/530
4,868,983 A 9/1989 Francis
4,901,437 A 2/1990 Iten
4,932,122 A 6/1990 Shurland et al.
4,932,123 A 6/1990 Francis
5,016,352 A * 5/1991 Metcalf ................ B26B 21/528
30/47
5,038,472 A 8/1991 Iderosa
5,044,077 A 9/1991 Ferraro et al.
5,107,590 A 4/1992 Burout, III et al.
5,134,775 A 8/1992 Althaus et al.
5,141,694 A 8/1992 Butlin et al.
5,157,834 A 10/1992 Chen et al.
5,182,858 A 2/1993 Chen
5,191,712 A 3/1993 Crook et al.
5,224,267 A 7/1993 Simms et al.
5,236,439 A 8/1993 Kozikowski
5,313,705 A 5/1994 Rivers et al.
5,313,706 A 5/1994 Motta et al.
5,318,429 A 6/1994 Butlin et al.
5,331,740 A 7/1994 Carson, III et al.
5,333,383 A 8/1994 Ferraro
5,359,774 A 11/1994 Althaus
5,365,665 A 11/1994 Coffin
5,373,638 A 12/1994 Coffin
5,377,409 A 1/1995 Chen
5,410,812 A 5/1995 Althaus
5,416,974 A 5/1995 Wain
5,426,851 A 6/1995 Gilder et al.
5,430,939 A 7/1995 Johnston
5,456,009 A 10/1995 Wexler
5,526,567 A 6/1996 Carson, III et al.
5,533,263 A 7/1996 Gilder
5,546,660 A 8/1996 Burout et al.
5,551,153 A 9/1996 Simms
5,557,851 A 9/1996 Ortiz
5,630,275 A 5/1997 Wexler
5,661,907 A 9/1997 Apprille, Jr.
5,669,139 A 9/1997 Oldroyd et al.
5,761,814 A 6/1998 Anderson et al.
5,784,790 A 7/1998 Carson, III et al.
5,787,586 A 8/1998 Apprille, Jr. et al.
5,794,354 A 8/1998 Gilder
5,813,119 A 9/1998 Ferraro et al.
5,813,293 A 9/1998 Apprille, Jr. et al.
5,822,869 A 10/1998 Metcalf et al.
5,855,071 A 1/1999 Apprille, Jr. et al.
5,918,369 A 7/1999 Apprille, Jr. et al.
5,953,824 A 9/1999 Ferraro et al.
5,953,825 A 9/1999 Christman et al.
5,956,851 A 9/1999 Apprille, Jr. et al.
6,009,624 A 1/2000 Apprille, Jr. et al.
6,026,577 A 2/2000 Ferraro
6,029,354 A 2/2000 Apprille, Jr. et al.
6,035,537 A 3/2000 Apprille, Jr. et al.
6,044,542 A 4/2000 Apprille, Jr. et al.
6,112,412 A 9/2000 Richard
6,115,924 A 9/2000 Oldroyd
6,122,826 A 9/2000 Coffin et al.
6,138,361 A 10/2000 Richard et al.
6,173,498 B1 1/2001 Warrick et al.
6,182,366 B1 2/2001 Richard
6,212,777 B1 4/2001 Gilder et al.
6,216,349 B1 4/2001 Gilder et al.
6,216,561 B1 4/2001 Dischler
6,266,884 B1 7/2001 Prochaska
6,276,062 B1 8/2001 Prochaska
6,295,734 B1 10/2001 Gilder et al.
6,311,400 B1 11/2001 Hawes et al.
6,317,990 B1 11/2001 Ferraro
6,381,857 B1 5/2002 Oldroyd
6,393,706 B1 5/2002 Ferraro
6,430,818 B1 8/2002 Wonderley
6,434,839 B1 8/2002 Lee et al.

(56) References Cited

U.S. PATENT DOCUMENTS

| | | | |
|---|---|---|---|
| 6,502,318 | B1 | 1/2003 | Gilder |
| 6,550,141 | B1 | 4/2003 | Rivers et al. |
| 6,560,881 | B2 | 5/2003 | Coffin |
| 6,584,696 | B2 | 7/2003 | Ferraro |
| 6,612,040 | B2 | 9/2003 | Gilder |
| 6,615,498 | B1 | 9/2003 | King et al. |
| 6,655,029 | B2 | 12/2003 | Saito |
| 6,769,180 | B2 | 8/2004 | Coffin |
| 6,772,523 | B1 | 8/2004 | Richard et al. |
| 6,792,682 | B2 | 9/2004 | Follo et al. |
| 6,807,739 | B2 | 10/2004 | Follo |
| 6,839,968 | B2 | 1/2005 | Brown, Jr. et al. |
| 6,854,188 | B1 | 2/2005 | Wonderley |
| 6,880,253 | B1 | 4/2005 | Gyllerstrom |
| 6,935,032 | B2 | 8/2005 | Follo |
| 6,990,740 | B2 | 1/2006 | Follo et al. |
| 7,047,646 | B2 | 5/2006 | Coffin |
| 7,086,160 | B2 | 8/2006 | Coffin et al. |
| 7,111,401 | B2 | 9/2006 | Richard |
| 7,137,205 | B2 | 11/2006 | Royle |
| 7,140,116 | B2 | 11/2006 | Coffin |
| 7,152,512 | B1 | 12/2006 | Prochaska |
| 7,168,173 | B2 | 1/2007 | Worrick, III |
| 7,191,523 | B2 | 3/2007 | Miyazaki et al. |
| 7,197,825 | B2 | 4/2007 | Walker et al. |
| 7,200,937 | B2 | 4/2007 | Richard et al. |
| 7,200,938 | B2 | 4/2007 | Lembke |
| 7,200,942 | B2 | 4/2007 | Richard |
| 7,210,229 | B2 | 5/2007 | Coffin |
| 7,266,895 | B2 | 9/2007 | Pennella et al. |
| 7,272,991 | B2 | 9/2007 | Aviza et al. |
| 7,331,107 | B2 | 2/2008 | Follo et al. |
| 7,448,135 | B2 | 11/2008 | Zhuk et al. |
| 7,461,458 | B2 | 12/2008 | Peyser et al. |
| 7,469,477 | B2 | 12/2008 | Coffin |
| 7,475,483 | B2 | 1/2009 | Peyser et al. |
| 7,526,869 | B2 | 5/2009 | Blatter et al. |
| 7,540,087 | B2 | 6/2009 | Rawle |
| 7,540,088 | B2 | 6/2009 | Takeshita |
| 7,574,809 | B2 | 8/2009 | Follo et al. |
| 7,578,062 | B2 | 8/2009 | Blackburn |
| 7,607,230 | B2 | 10/2009 | Aviza et al. |
| 7,617,607 | B2 | 11/2009 | Pennell et al. |
| 7,621,203 | B2 | 11/2009 | Aviza |
| 7,669,335 | B2 | 3/2010 | Walker et al. |
| 7,676,929 | B2 | 3/2010 | Lembke et al. |
| 7,681,314 | B2 | 3/2010 | Follo |
| 7,685,720 | B2 | 3/2010 | Efthimiadis et al. |
| 7,690,122 | B2 | 4/2010 | Worrick, III et al. |
| 7,739,797 | B2 | 6/2010 | Rawle |
| 7,765,700 | B2 | 8/2010 | Aviza et al. |
| 7,770,294 | B2 | 8/2010 | Bruno et al. |
| 7,802,368 | B2 | 9/2010 | Coffin et al. |
| 7,810,240 | B2 | 10/2010 | Lee et al. |
| 7,877,879 | B2 | 2/2011 | Nakasuka |
| 7,895,754 | B2 | 3/2011 | Blackburn |
| 7,913,393 | B2 | 3/2011 | Royle et al. |
| 7,966,731 | B2 | 6/2011 | Walker et al. |
| 7,992,304 | B2 | 8/2011 | Nakasuka |
| 8,033,023 | B2 | 10/2011 | Johnson et al. |
| 8,046,920 | B2 | 11/2011 | Nakasuka |
| 8,096,054 | B2 | 1/2012 | Denkert et al. |
| 8,104,179 | B2 | 1/2012 | Nakasuka |
| 8,104,184 | B2 | 1/2012 | Walker |
| 8,117,753 | B2 | 2/2012 | Gilder et al. |
| 8,146,255 | B2 | 4/2012 | Denkert et al. |
| 8,151,472 | B2 | 4/2012 | Dimitris et al. |
| 8,205,343 | B2 | 6/2012 | Winter et al. |
| 8,205,344 | B2 | 6/2012 | Stevens |
| 8,225,510 | B2 | 7/2012 | Peterson et al. |
| 8,234,789 | B2 | 8/2012 | Avens et al. |
| 8,281,497 | B2 | 10/2012 | Takeba |
| 8,286,354 | B2 | 10/2012 | Walker, Jr. et al. |
| 8,336,212 | B2 | 12/2012 | Bozikis et al. |
| 8,359,751 | B2 | 1/2013 | Efthimiadis et al. |
| 8,359,752 | B2 | 1/2013 | Bridges |
| 8,381,406 | B2 | 2/2013 | Miyazaki |
| 8,448,339 | B2 | 5/2013 | Walker, Jr. et al. |
| 8,474,144 | B2 | 7/2013 | Royle |
| 8,499,459 | B2 | 8/2013 | Efthimiadis et al. |
| 8,533,959 | B2 | 9/2013 | Davis |
| 8,544,177 | B2 | 10/2013 | Rawle et al. |
| 8,567,068 | B2 | 10/2013 | Luxton |
| 8,590,162 | B2 | 11/2013 | Park et al. |
| 8,640,342 | B2 | 2/2014 | Murgida |
| 8,707,562 | B2 | 4/2014 | Coffin |
| 8,732,955 | B2 | 5/2014 | Howell et al. |
| 8,732,965 | B2 | 5/2014 | Efthimiadis et al. |
| 8,745,882 | B2 | 6/2014 | Murgida et al. |
| 8,745,883 | B2 | 6/2014 | Murgida et al. |
| 8,769,825 | B2 | 7/2014 | Howell et al. |
| 8,782,903 | B2 | 7/2014 | Clarke et al. |
| 8,789,282 | B2 | 7/2014 | Wilson et al. |
| 8,793,880 | B2 | 8/2014 | Taub et al. |
| 8,938,885 | B2 | 1/2015 | Stevens |
| 8,978,258 | B2 | 3/2015 | Patel et al. |
| 8,984,756 | B2 | 3/2015 | Worrick, III |
| 8,991,058 | B2 | 3/2015 | Dimitris et al. |
| 9,015,951 | B2 | 4/2015 | Howell et al. |
| 9,032,627 | B2 | 5/2015 | Dimitris et al. |
| 9,032,631 | B2 | 5/2015 | Christie et al. |
| 9,073,226 | B2 | 7/2015 | Szczepanowski et al. |
| 9,193,077 | B2 | 11/2015 | Worrick |
| 9,193,078 | B2 | 11/2015 | Worrick, III |
| 9,193,079 | B2 | 11/2015 | Howell et al. |
| 9,248,579 | B2 | 2/2016 | DePuydt et al. |
| 9,259,846 | B1 | 2/2016 | Robertson |
| 9,283,685 | B2 * | 3/2016 | Griffin .................. B26B 21/521 |
| 9,296,117 | B2 | 3/2016 | Fathallah et al. |
| 9,321,182 | B2 | 4/2016 | Bridges et al. |
| 9,327,414 | B2 | 5/2016 | Szczepanowski et al. |
| 9,333,657 | B2 | 5/2016 | Westerhof et al. |
| 9,364,961 | B2 | 6/2016 | Lelieveld |
| 9,381,657 | B2 | 7/2016 | Xu et al. |
| 9,434,079 | B2 | 9/2016 | Worrick, III |
| 9,469,038 | B2 | 10/2016 | Iaccarino et al. |
| 9,475,202 | B2 | 10/2016 | Griffin et al. |
| 9,486,930 | B2 | 11/2016 | Provost et al. |
| 9,498,892 | B2 | 11/2016 | Nakasuka et al. |
| 9,579,809 | B2 | 2/2017 | Hawes |
| 9,586,330 | B2 | 3/2017 | Xu et al. |
| 9,623,575 | B2 | 4/2017 | Griffin et al. |
| 9,630,331 | B2 | 4/2017 | Griffin et al. |
| 9,643,327 | B2 | 5/2017 | Stevens et al. |
| 9,656,401 | B2 | 5/2017 | Burrowes et al. |
| 9,738,000 | B2 | 8/2017 | Ariyanayagam et al. |
| 9,993,931 | B1 | 6/2018 | Zucker |
| 10,538,007 | B2 | 1/2020 | Zucker |
| 10,569,435 | B2 | 2/2020 | Zucker |
| 2002/0138992 | A1 | 10/2002 | Richard |
| 2002/0189112 | A1 | 12/2002 | Peyser |
| 2003/0046819 | A1 | 3/2003 | Ferraro et al. |
| 2003/0061718 | A1 | 4/2003 | Dansreau |
| 2003/0079348 | A1 | 5/2003 | Follo |
| 2003/0213130 | A1 | 11/2003 | Motta |
| 2004/0103538 | A1 | 6/2004 | Dansreau et al. |
| 2004/0128835 | A1 | 7/2004 | Coffin et al. |
| 2004/0181949 | A1 | 9/2004 | Coffin et al. |
| 2004/0181953 | A1 | 9/2004 | Follo et al. |
| 2004/0181954 | A1 | 9/2004 | Follo et al. |
| 2004/0216310 | A1 | 11/2004 | Santhagens Van Eibergen et al. |
| 2004/0231161 | A1 | 11/2004 | Coffin et al. |
| 2004/0255467 | A1 | 12/2004 | Lembke et al. |
| 2005/0015991 | A1 | 1/2005 | Follo et al. |
| 2005/0039338 | A1 | 2/2005 | King et al. |
| 2005/0241162 | A1 | 11/2005 | Nicolosi et al. |
| 2006/0032056 | A1 | 2/2006 | Coffin et al. |
| 2006/0242847 | A1 | 11/2006 | Dansreau et al. |
| 2006/0254056 | A1 | 11/2006 | Coffin et al. |
| 2006/0260131 | A1 | 11/2006 | Follo |
| 2006/0283025 | A1 | 12/2006 | Follo et al. |
| 2007/0056167 | A1 | 3/2007 | Richard et al. |
| 2007/0227009 | A1 | 10/2007 | Zhuk et al. |
| 2007/0266565 | A1 | 11/2007 | Aviza et al. |

(56) References Cited

U.S. PATENT DOCUMENTS

| | | | |
|---|---|---|---|
| 2008/0034593 | A1 | 2/2008 | Coffin |
| 2008/0250646 | A1 | 10/2008 | Nakasuka |
| 2008/0250647 | A1 | 10/2008 | Fischer et al. |
| 2009/0083982 | A1 | 4/2009 | Forsdike |
| 2009/0113716 | A1 | 5/2009 | Wain et al. |
| 2009/0188112 | A1 | 7/2009 | Prochaska et al. |
| 2009/0193659 | A1 | 8/2009 | Park et al. |
| 2010/0154220 | A1 | 6/2010 | Nakasuka |
| 2010/0251555 | A1 | 10/2010 | Park et al. |
| 2010/0313424 | A1 | 12/2010 | Johnson et al. |
| 2011/0035950 | A1* | 2/2011 | Royle .................. B26B 21/522 30/527 |
| 2011/0094108 | A1 | 4/2011 | Wain |
| 2011/0119922 | A1 | 5/2011 | Ntavos et al. |
| 2011/0232101 | A1 | 9/2011 | Park et al. |
| 2012/0124840 | A1 | 5/2012 | Iaccarino et al. |
| 2012/0151772 | A1 | 6/2012 | Moon et al. |
| 2012/0242977 | A1 | 9/2012 | Linares et al. |
| 2012/0279070 | A1 | 11/2012 | Seo |
| 2013/0008029 | A1 | 1/2013 | Hill et al. |
| 2013/0097869 | A1 | 4/2013 | Wang et al. |
| 2013/0160305 | A1 | 6/2013 | Howell et al. |
| 2013/0205595 | A1 | 8/2013 | Bykowski et al. |
| 2013/0269190 | A1 | 10/2013 | Worrick, III |
| 2013/0312265 | A1 | 11/2013 | Wilson et al. |
| 2013/0326881 | A1 | 12/2013 | Blatter |
| 2014/0000114 | A1 | 1/2014 | Wester et al. |
| 2014/0026424 | A1 | 1/2014 | Oglesby et al. |
| 2014/0033551 | A1 | 2/2014 | Szczepanowski et al. |
| 2014/0068953 | A1 | 3/2014 | Wonderley |
| 2014/0083265 | A1 | 3/2014 | Provost et al. |
| 2014/0096402 | A1 | 4/2014 | Nakasuka et al. |
| 2014/0116211 | A1 | 5/2014 | Griffin et al. |
| 2014/0165800 | A1 | 6/2014 | Griffin et al. |
| 2014/0237830 | A1 | 8/2014 | Wilson et al. |
| 2014/0245613 | A1 | 9/2014 | Good et al. |
| 2014/0259675 | A1 | 9/2014 | Tucker et al. |
| 2014/0283387 | A1 | 9/2014 | Bozikis et al. |
| 2014/0331500 | A1 | 11/2014 | Ren |
| 2015/0013169 | A1 | 1/2015 | Warrick |
| 2015/0090085 | A1 | 4/2015 | Griffin et al. |
| 2015/0121704 | A1 | 5/2015 | Bridges et al. |
| 2015/0158190 | A1 | 6/2015 | Georgakis et al. |
| 2015/0190935 | A1 | 7/2015 | Griffin et al. |
| 2015/0197017 | A1 | 7/2015 | Lettenberger et al. |
| 2015/0217466 | A1 | 8/2015 | Leicht et al. |
| 2015/0239137 | A1 | 8/2015 | Davos et al. |
| 2015/0273708 | A1 | 10/2015 | Haba |
| 2015/0290819 | A1* | 10/2015 | Giannopoulos ....... B26B 21/521 30/532 |
| 2015/0314465 | A1 | 11/2015 | Giannopoulos et al. |
| 2015/0314466 | A1 | 11/2015 | Papadopoulos-Papageorgis et al. |
| 2016/0001454 | A1 | 1/2016 | Coresh |
| 2016/0001455 | A1 | 1/2016 | Swenson |
| 2016/0031101 | A1 | 2/2016 | Fulton |
| 2016/0082610 | A1 | 3/2016 | Bamundaga |
| 2016/0096280 | A1 | 4/2016 | Robertson |
| 2016/0158948 | A1 | 6/2016 | Eagleton et al. |
| 2016/0158950 | A1 | 6/2016 | Griffin et al. |
| 2016/0236364 | A1 | 8/2016 | Varenberg et al. |
| 2016/0279817 | A1 | 9/2016 | Washington et al. |
| 2016/0297086 | A1 | 10/2016 | Efthimiadis et al. |
| 2017/0021513 | A1 | 1/2017 | Liberatore |
| 2017/0028577 | A1 | 2/2017 | Ntavos et al. |
| 2017/0151684 | A1 | 6/2017 | Bozikis et al. |
| 2017/0282389 | A1 | 10/2017 | Jolley et al. |
| 2018/0071931 | A1 | 3/2018 | Walker, Jr. et al. |
| 2018/0236677 | A1 | 8/2018 | Blatter |

FOREIGN PATENT DOCUMENTS

| | | | |
|---|---|---|---|
| CN | 104870149 | A | 8/2015 |
| CN | 105196323 | A | 12/2015 |
| CN | 104870149 | B | 6/2017 |
| CN | 104853887 | B | 9/2017 |
| DE | 2915801 | A1 | 10/1980 |
| DE | 10327739 | A1 | 1/2005 |
| DE | 60104558 | T2 | 7/2005 |
| DE | 10327739 | B4 | 6/2006 |
| DE | 102004061446 | A1 | 6/2006 |
| DE | 102010006807 | A1 | 9/2010 |
| DE | 202011107715 | U1 | 1/2012 |
| DE | 202013002343 | U1 | 4/2013 |
| DE | 202013003009 | U1 | 6/2013 |
| DE | 102013007224 | A1 | 9/2014 |
| DE | 102013007223 | A1 | 10/2014 |
| DE | 202014007575 | U1 | 10/2014 |
| DE | 102013213862 | A1 | 1/2015 |
| DE | 102015002458 | A1 | 9/2016 |
| EP | 1332026 | B1 | 7/2004 |
| EP | 1488894 | A1 | 12/2004 |
| EP | 1671761 | A1 | 6/2006 |
| EP | 1488894 | B1 | 7/2007 |
| EP | 1847360 | A1 | 10/2007 |
| EP | 2227360 | A1 | 9/2010 |
| EP | 2583800 | A1 | 4/2013 |
| EP | 3075498 | A1 | 10/2016 |
| ES | 2290591 | T3 | 2/2008 |
| ES | 2342497 | T3 | 7/2010 |
| ES | 1079011 | U | 4/2013 |
| GB | 2461054 | A | 12/2009 |
| GB | 2507971 | A | 5/2014 |
| IT | PI20110077 | A1 | 1/2013 |
| NL | 2013416 | A | 10/2015 |
| RO | 118269 | B1 | 4/2003 |
| RU | 2433909 | C1 | 11/2011 |
| SE | 1230136 | A1 | 5/2014 |
| TR | 200402255 | T4 | 10/2004 |
| WO | WO-9957544 | A1 | 11/1999 |
| WO | WO-0200401 | A1 | 1/2002 |
| WO | WO-0232632 | A2 | 4/2002 |
| WO | WO-0232633 | A2 | 4/2002 |
| WO | WO-2009066218 | A1 | 5/2009 |
| WO | WO-2010139618 | A1 | 12/2010 |
| WO | WO-2012005839 | A2 | 1/2012 |
| WO | WO-2012158141 | A1 | 11/2012 |
| WO | WO-2012158142 | A1 | 11/2012 |
| WO | WO-2014075844 | A1 | 5/2014 |
| WO | WO-2014137770 | A1 | 9/2014 |
| WO | WO-2014139655 | A2 | 9/2014 |
| WO | WO-2014139655 | A3 | 11/2014 |
| WO | WO-2015090385 | A1 | 6/2015 |
| WO | WO-2016036238 | A2 | 3/2016 |
| WO | WO-2016040549 | A1 | 3/2016 |
| WO | WO-2016113553 | A1 | 7/2016 |
| WO | WO-2016161016 | A1 | 10/2016 |

* cited by examiner

604

RAZOR CARTRIDGE

CROSS REFERENCE TO RELATED APPLICATIONS

This application is a continuation of and claims priority to U.S. patent application Ser. No. 17/672,679 filed on Feb. 15, 2022 (now U.S. Pat. No. 11,745,371), which in turn is a continuation of and claims priority to U.S. patent application Ser. No. 16/663,318 filed on Oct. 24, 2019, (now U.S. Pat. No. 11,298,845), which in turn is a continuation of and claims priority to U.S. patent application Ser. No. 15/977,964 filed on May 11, 2018 (now U.S. Pat. No. 10,569,435), which in turn is a continuation of and claims priority to U.S. patent application Ser. No. 15/380,760 filed on Dec. 15, 2016 (now U.S. Pat. No. 9,993,931), which in turn claims priority to U.S. Provisional Application No. 62/425,820 filed on Nov. 23, 2016, the entireties of which are all hereby incorporated by reference.

TECHNICAL FIELD

This application relates to the field of shaving razor assemblies including handles, cartridges and/or interaction between the component parts of a shaving razor assembly.

BACKGROUND

Previously, shaving razors and razor cartridges suffered from inherent drawbacks based on their docking mechanisms and pivots systems. Such razors did not provide comfortable shaves, could not easily dock cartridges and had pivot mechanisms that could wear out.

SUMMARY

Systems and methods here include improved razor blade cartridges, handles, and docking/pivot mechanisms between the two. Some embodiments include a shaving razor system, including a razor handle with a back end and a docking end, the docking end including, a central pushrod mounted by a spring in the handle, the spring being biased to push the pushrod away from the handle, one hook arm mounted to the handle at an axis, the hook arm having a hook end and a pivot end, the hook arm being mounted to the handle proximately to the pushrod, and a slidable button connected to the handle in communication with the pivot end of the hook arm.

Systems and methods here include shaving cartridges with a cap, guard, razor blades, and a receiver section mounted thereon. In some embodiments, the receiver section includes a structure with a barrel shaped interior, a tab to engage a hook from a handle and a flat next to the tab for the hook to pivot into and disengage the tab. Systems and methods here include combinations of the handle and cartridge as described herein.

In some embodiments, the systems include a razor handle with a back end and a docking end, the docking end including, a central pushrod mounted by a spring in the handle, the spring being biased to push the pushrod out from the handle, one hook arm mounted to the handle at an axis, the hook arm having a hook end and a pivot end with the axis mounted between the hook end and pivot end, the hook arm being mounted to the handle under the pushrod, and a slidable button connected to the handle in communication with the pivot end of the hook arm, configured to pivot the hook arm. In some embodiments, the hook arm is made of rigidly flexible material. And in some embodiments, the shaving cartridge has a front side with a cap and guard and a back side with a receiver structure shaped to engage a barrel end of the central pushrod. Alternatively or additionally, in some embodiments, the shaving cartridge back side includes one central hook tab in the receiver structure, the central hook tab shaped to engage with the hook arm hook end on the handle. In some embodiments the pushrod barrel end includes a recessed portion configured so that the hook arm may be mounted under the pushrod and the hook end may fit near the pushrod barrel. In some embodiments, the receiver structure the guard on the cartridge are made of a plastic with slippery properties. In some embodiments, the shaving cartridge is spring biased by the pushrod toward its front side when mounted to the handle. Alternatively or additionally, in some embodiments, the receiver structure and a guard on the cartridge are coated in a polymer material. In some embodiments, the slidable button includes a cam configured to contact with the pivot end of the hook arm when the slidable button is in a forward position.

Alternatively or additionally, embodiments here include a razor cartridge with a frame having a front side and a back side, a plurality of razor blades mounted in the frame, a cap, a guard, and a docking receiver, wherein the cap and guard are mounted on the front side of the razor cartridge, wherein the docking receiver is mounted on the back side of the razor cartridge and the docking receiver includes receiving walls, a tab, and a well.

Alternatively or additionally, some embodiments include a razor handle with a back end and a docking end, the docking end including, a central pushrod mounted with a spring in the handle, one hook arm mounted to the handle at an axis, the hook arm having a hook end and a pivot end on either side of the axis, and a slidable button connected to the handle, configured to communicate with the pivot end of the hook arm in a forward position. In some embodiments, the pushrod includes a barrel end arranged perpendicular to the pushrod, and the pushrod barrel end is configured to fit into the docking receiver on the razor cartridge.

Alternatively or additionally, some embodiments include a razor cartridge with a front and a back, including a docking receiver structure on the back, wherein the docking receiver includes walls forming a basket and a central tab, and a razor handle with a back end and a docking end, the docking end including, a central pushrod, wherein the central pushrod is mounted with a spring in the handle, one hook arm mounted to the handle at an axis between a hook end and a pivot end, and a slidable button connected to the handle configured to communicate with the pivot end of the hook arm in a forward position.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter resented herein. But it will be apparent to one of ordinary skill in the art that the subject matter may be practiced without these specific details. Moreover, the particular embodiments described herein are provided by way of example and should not be used to limit the scope of the disclosures to these particular embodiments.

Overview

The razor cartridge docking system embodiments described here include various features for a razor cartridge and a razor handle, the interaction between the two and the structures used to hold or dock a razor cartridge to the handle. Some embodiments include features used to allow the cartridge to pivot with respect to the handle during a shaving operation. And some embodiments include features used to not only dock a cartridge but also discharge or eject a cartridge from the handle.

Figure 1:
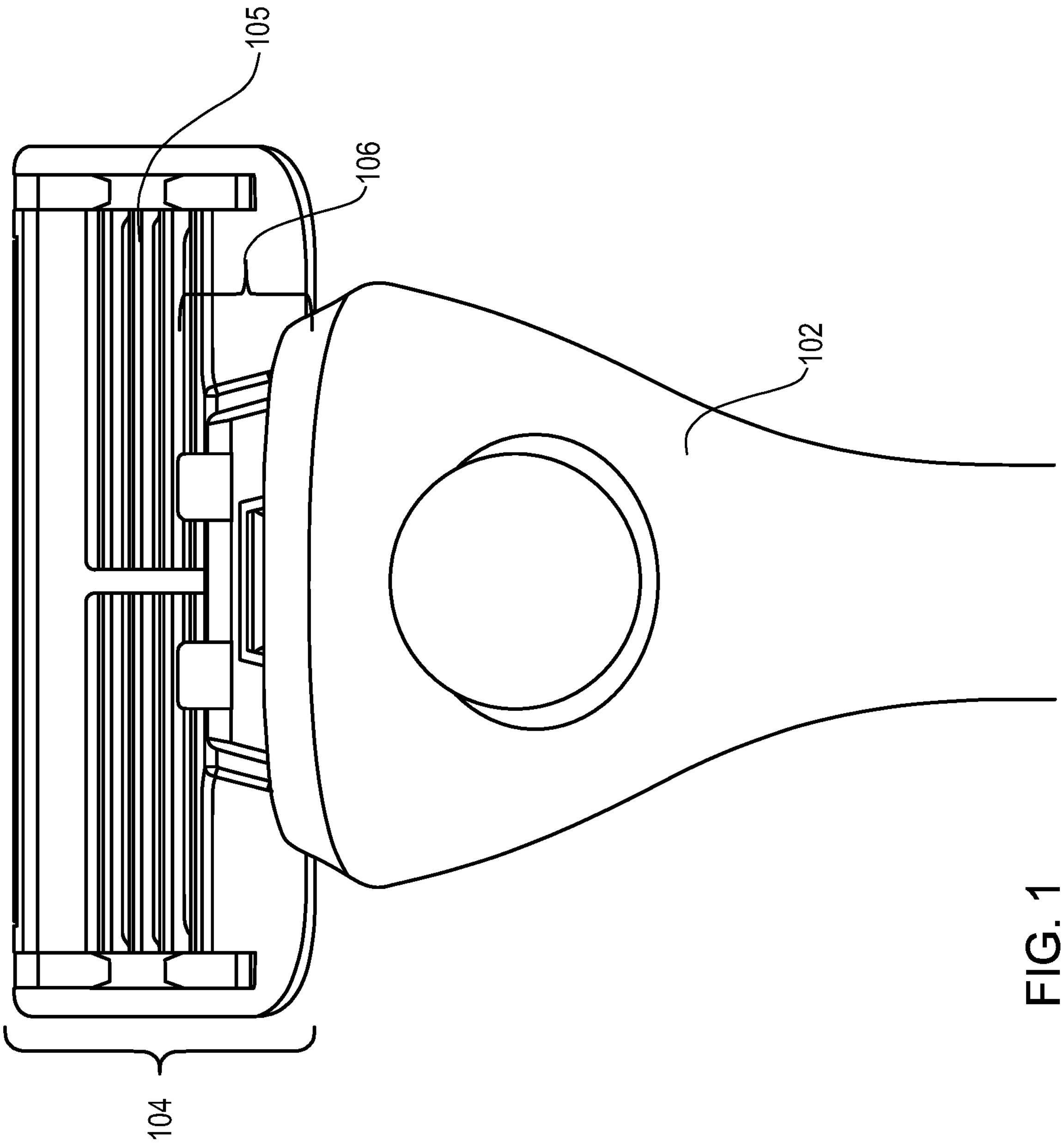
FIG. 1 is an example top down illustration of a razor cartridge and handle with docking mechanism according to certain embodiments described here.

FIG. 1 shows top down view of an example embodiment end of a handle 102 and an example embodiment cartridge 104 with a docking system 106 connecting the handle 102 and the cartridge 104. The cartridge 104 is a razor cartridge with any number of blades 105 mounted in it and a cap and guard (not shown) on the front of it. In some embodiments, the handle 102 can release the cartridge 104, leaving portions of the docking system 106 with the handle 102, and other engaging docking portions on the cartridge 104. Further details of the docking system 106 are described below. When in the upright docked arrangement, as shown in FIG. 1, the razor can be used to shave hair from a user. When the blades dull, the cartridge 104 can be ejected, and a new cartridge 104 can be docked to the handle 102. In some embodiments, the cartridge 104 may pivot, relative to the handle 102 to maintain skin contact during a shave operation and return to an upright resting position as shown in FIG. 1 after a shave.

As can be seen from FIG. 1, one of many advantages of the arrangement of the docking system 106 being placed as low as it is on the cartridge head 104 is that it does not interfere with the blades 105 on the cartridge head 104. This allows for a superior rinse through of water and material through the open backed the cartridge head 104 and between the blades 105 as they may be supported by an internal frame system without interference of the docking mechanism 106.

Figure 2:
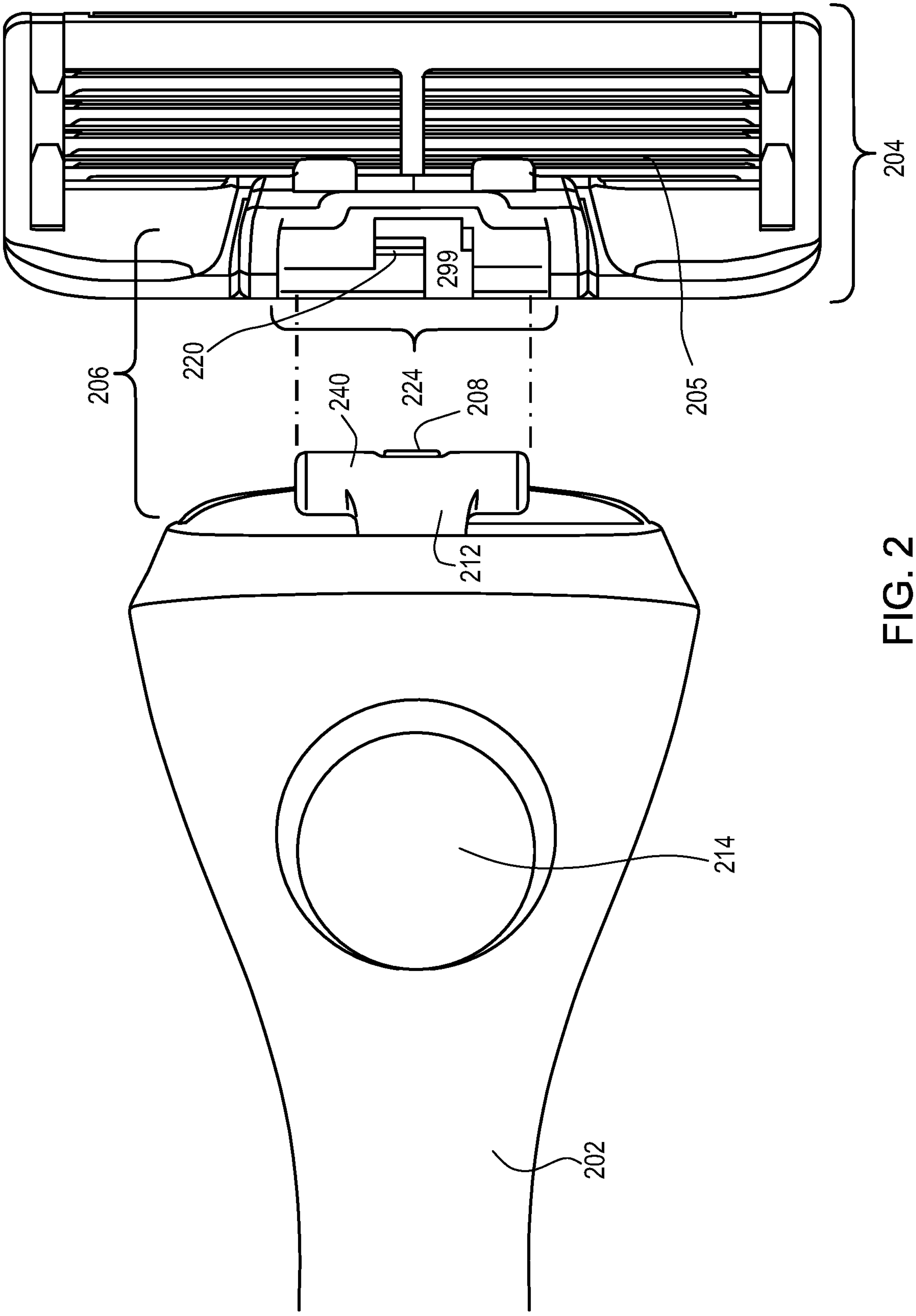
FIG. 2 is an example illustration of a cartridge and handle docking according to certain embodiments described here.

FIG. 2 shows an illustration of the handle 202 and the cartridge 204 separated but aligned for docking or just after an ejection of the cartridge 204. In FIG. 2, the pushrod 212 is retracted into the handle 202 as if it were docked to the cartridge 204 but in some embodiments, the pushrod 212 is spring loaded as described herein which would cause it to push forward to its normal resting position, extended from the handle 202. In some examples, the spring is a compression spring, biased to push the pushrod in a direction away from the handle. Thus, in the spring loaded examples, in a normal resting position, the pushrod 212 would be extended in a direction away from the handle 202 as explained herein. Then, as explained below, to dock the cartridge 204 to the handle 202, the barrel 240 of the pushrod 212 may be lined up with the receiving section/structure or docking structure 224 on the cartridge 204 and the pushrod 212 is pushed into the receiver section 224. By pushing the pushrod 212 into the receiver section 224, the pushrod 212 would retract into the handle 202 by a user compressing the spring (internal to the handle 202).

To dock a cartridge 204 to a handle 202, a user may push the handle 202 far enough toward the cartridge 204 until the single hook 208, shown just under the pushrod barrel 240 and lined up with the tab 220 in the receiver section 224 on the cartridge 204, interacts with the tab 220 and snaps into place to secure the cartridge head 204 to the handle. The single hook 208 may then deflect and slide over the tab 220 and then snap down into place once the hook portion 208 is pushed far enough into the receiver section 224. The sides of the pushrod barrel 240 may then engage with the material lining the inside of the receiver section 224.

For some embodiments, in a docked position, only the single hook 208 may hold the cartridge head 204 to the handle 202 in some embodiments. The pushrod 212 when docked may exert a spring force away from the handle 202 by pushing on the receiver section 224. As this receiver section 224 is behind the tab 220 where the single hook 208 connects, the pushrod 212 exerts the return force for the cartridge head 204 when it pivots around the fulcrum of the single hook 208 and tab 220 as described herein.

In some embodiments, the cartridge includes a gap, well, space or flat area 299 just to the side of the tab 220. This gap 299 may allow the single hook 208 to pivot off of the tab 220 and disengage the cartridge 204 as described herein. It should be noted that the depiction of the flat area 220 being arranged to the right of the tab 220 is an example only and the two could be reversed, with the tab 220 on the right and the flat area 299 on the left. The arrangement is meant to coincide with the operation of the single hook 208 explained herein. Thus, if the single hook 208 is configured in the handle 202 to pivot to the right when a button or slider 214 is depressed, then the flat area 299 should be arranged to the right of the tab 299 and vice versa.

In the arrangement of FIG. 2, no part of the receiver section 224 covers the blades 205 and thus, water and material may rinse through and between the blades more easily than if the docking structures 206 such as the receiver section 224 were built over and on top of the blades 205. Again, this arrangement of the receiver section 224 on the cartridge head 204 as low as it is shown in FIG. 2 minimizes the impediments it may make to the open back of the cartridge 204 and thereby the space between the blades 205. Thus, the rinse-through of the blades 205 is not affected by the arrangement of the receiver section 224 on the cartridge 204.

It should be noted that the pushrod barrel 240 may be made of any kind of inflexible sturdy material for repeated use. The pushrod barrel 240 may be made of metal, hard plastic, carbon fiber, ceramics, composites, and/or and other kind of hard material. The single hook 208 may be made of a resilient yet slightly flexible material so it can bend over the tab 220 when docked, yet still be able to snap into place to secure the tab 220 when it is pushed far enough into the receiver section 224. In such a way the single hook 208 may be made of metal, plastic or composite material that is resiliently flexible.

Handle Overview

Figure 3:
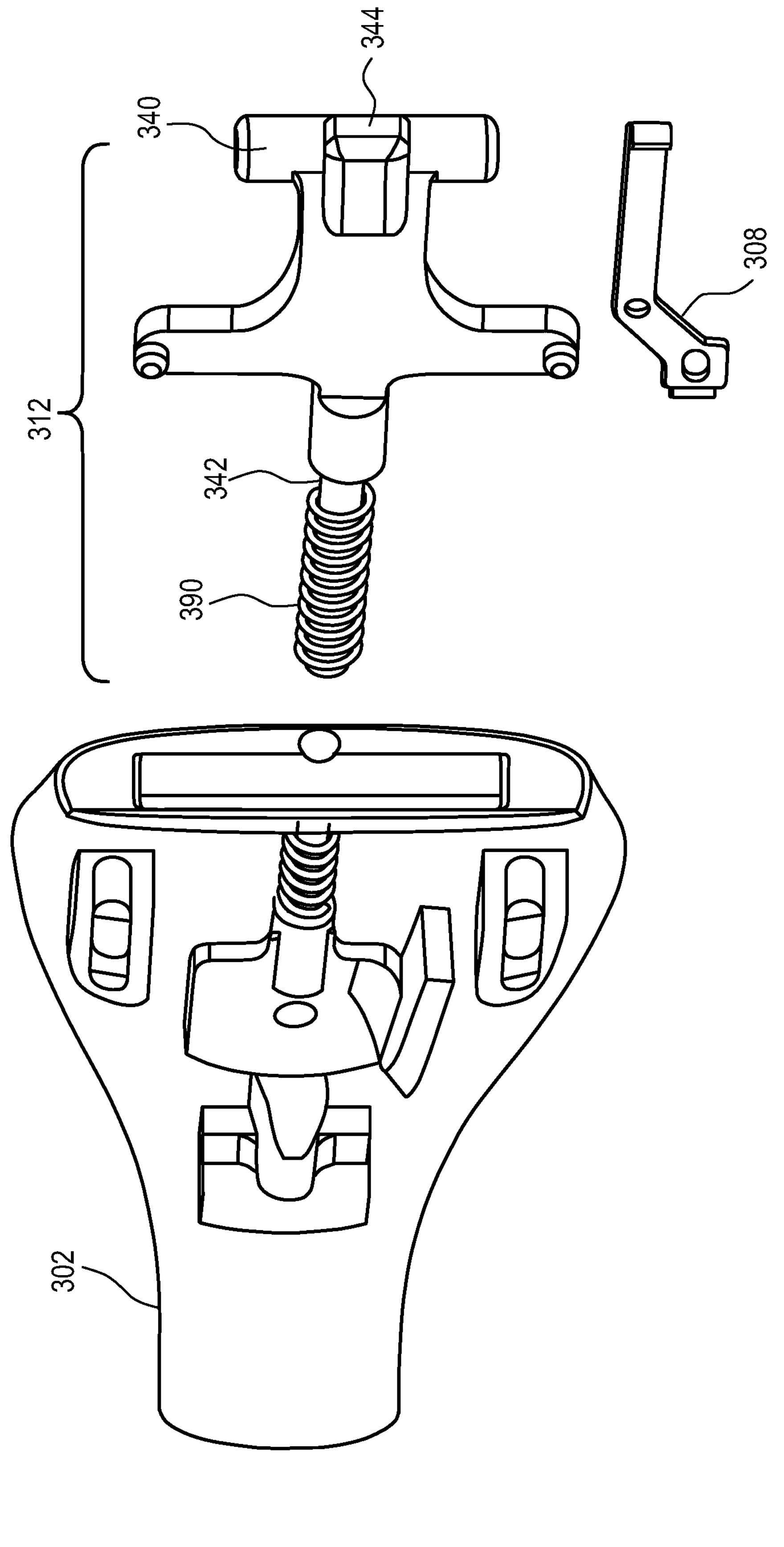
FIG. 3 is an example exploded illustration of a handle with docking mechanism according to certain embodiments described here.

FIG. 3 shows an example embodiment of the under-side, exploded view of an example handle 302 with the pushrod 312 and the single hook 308 as well as the spring 390 removed. As can be seen from the example of FIG. 3 that in some embodiments, the pushrod 312 includes both a pushrod barrel 340 and a pushrod arm 342 which can be coupled to a spring 390. As can be seen in FIG. 3, the pushrod barrel 340 is arranged generally perpendicular to the pushrod itself 342. In such an example, the pushrod barrel 340 may be shorter in length than the pushrod 342 and be configured to fit into a cartridge receiver structure, as described herein. The spring 390 may bias the pushrod 312 in a direction away from the handle 302 to facilitate a cartridge ejection when the single hook 308 decouples from the cartridge (not shown) as disclosed herein as well as provide the return force for a cartridge pivot. In some examples, the pushrod 312 also includes a gap or cutout 344 in the underside of the pushrod barrel 340 that is configured to provide space for the single hook 308. In some embodiment, the single hook 308 may be mounted under the pushrod 312 in the handle 302, to sit in the middle of the handle 302 during resting and docking positions and stick out slightly past the pushrod barrel 340 as well as pivot when the button is pushed to disengage the cartridge. By such an arrangement, the single hook 308 in a resting position may be able to flex to engage the razor cartridge tab as explained herein when pushed onto the cartridge for docking. The single hook 308 may also pivot when disengaged by the spring 390 and disengage the cartridge tab (not shown) in an ejection situation as described herein.

When resting, in some example embodiments, the pushrod 312 may be extended from the handle 302 by force from the spring 390 mounted in the handle 302. Such an example uses a spring which is biased to push the pushrod 312 in a direction away from the handle 302. When docked to a cartridge head, only the single spring 308 may hold the cartridge head to the handle, and the pushrod 312 may maintain a spring force in a direction away from the handle 302. This spring force from the pushrod 312 spring 390 may then eject the cartridge when the single hook 308 pivots to disengage from the cartridge tab as disclosed herein. The same spring force may also be the return force for the cartridge when it pivots during a shave operation.

Figure 4:
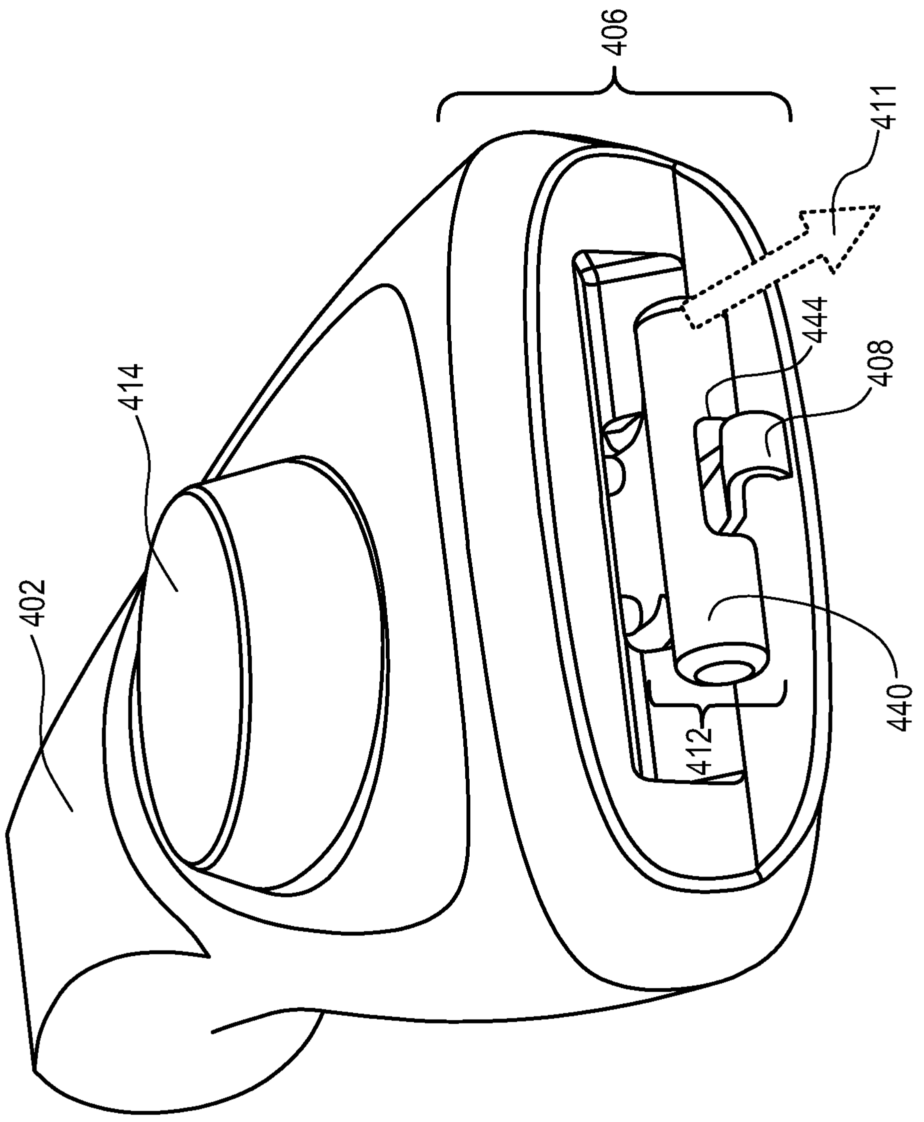
FIG. 4 is another example perspective illustration of a razor handle with docking mechanism according to certain embodiments described here.

FIG. 4 shows another perspective view of the handle 402 and the docking system 406 including a single hook 408 mounted under the gap 444 in the pushrod 412. In some embodiments, the docking system 406 may be used to both connect the handle 402 and the razor cartridge but also provide a pivot for the cartridge in relation to the handle 402. FIG. 4 also shows a button 414 on the handle 402. The button 414 in some embodiments is spring loaded and configured to slide forward when pushed by a user, toward the end of the handle 402 with the docking system 406. By pushing the button 414, a lever and cam inside the handle may move the single hook 408 to one side as explained below. In some embodiments, the pushrod 412 may be spring loaded inside the handle 402 and may slide into and out of the handle 402 but be spring biased to push in a direction away from the handle 402.

Figure 5:
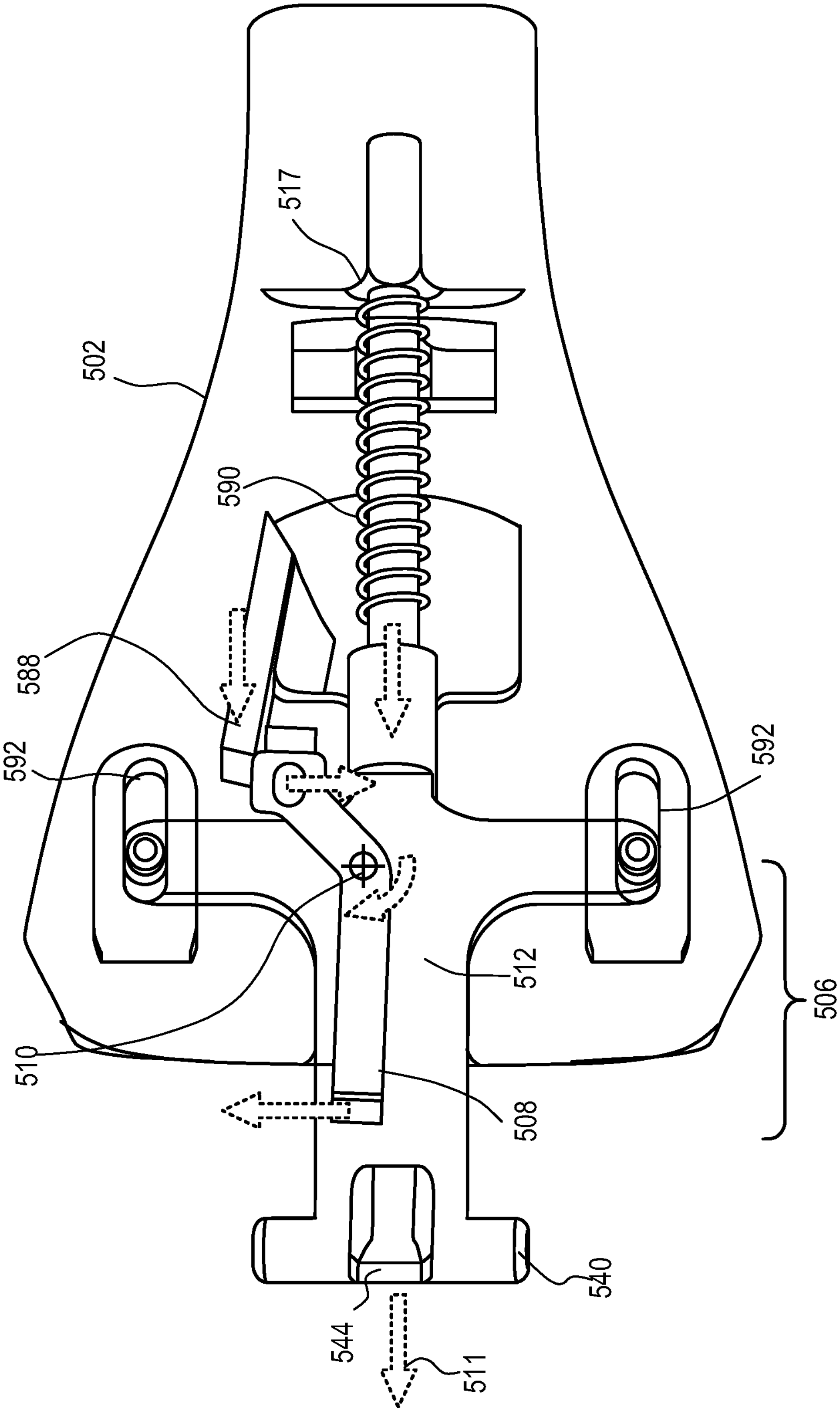
FIG. 5 is an example cut away illustration of a handle with docking mechanism according to certain embodiments described here.

FIG. 5 shows an example illustration of the inside of the assembled underside of the docking system 506 and handle 502. The assembled docking system 506 is shown as including the single hook 508 and the pushrod 512, the two components of the docking system 506 visible from the end of the handle 502 as shown in FIG. 4. In FIG. 5, the pushrod 512 is in its natural position, extended from the handle 502 biased by the spring 590 which is configured to push it in a direction away from the handle 502. The underside of the pushrod 512 barrel section 540 includes a cutout 544 which may allow the single hook 508 to move without interference while the pushrod 512 is in different positions, extending from the handle 502. The spring 590 is shown attached to the pushrod 512. In some embodiments, as shown are two guide slots 592 that the pushrod 512 is configured to traverse during actuation to limit the travel distance of the pushrod 512. In some embodiments, the guide slots are not used, and instead a sliding ridge is formed in the top of the pushrod to align it during sliding movement. In such examples, a step or ledge may be formed in the pushrod 512, and/or the sliding ridge to limit the travel of the pushrod 512 in the handle 502.

In some embodiments, the pushrod 512 is biased out, forward, and away from the handle 502 by the spring 590. Thus, in a resting position, the pushrod 512 would be extended from the handle 502 as shown in FIG. 5. But as described herein, when docked, the single hook 508 may hold the cartridge (not shown) close to the handle 502 which can only occur when the pushrod 512 is pushed back into the handle 502, thereby compressing the spring 590 which would continue to push the pushrod 512 even when docked.

Cartridge Overview

Figure 6:
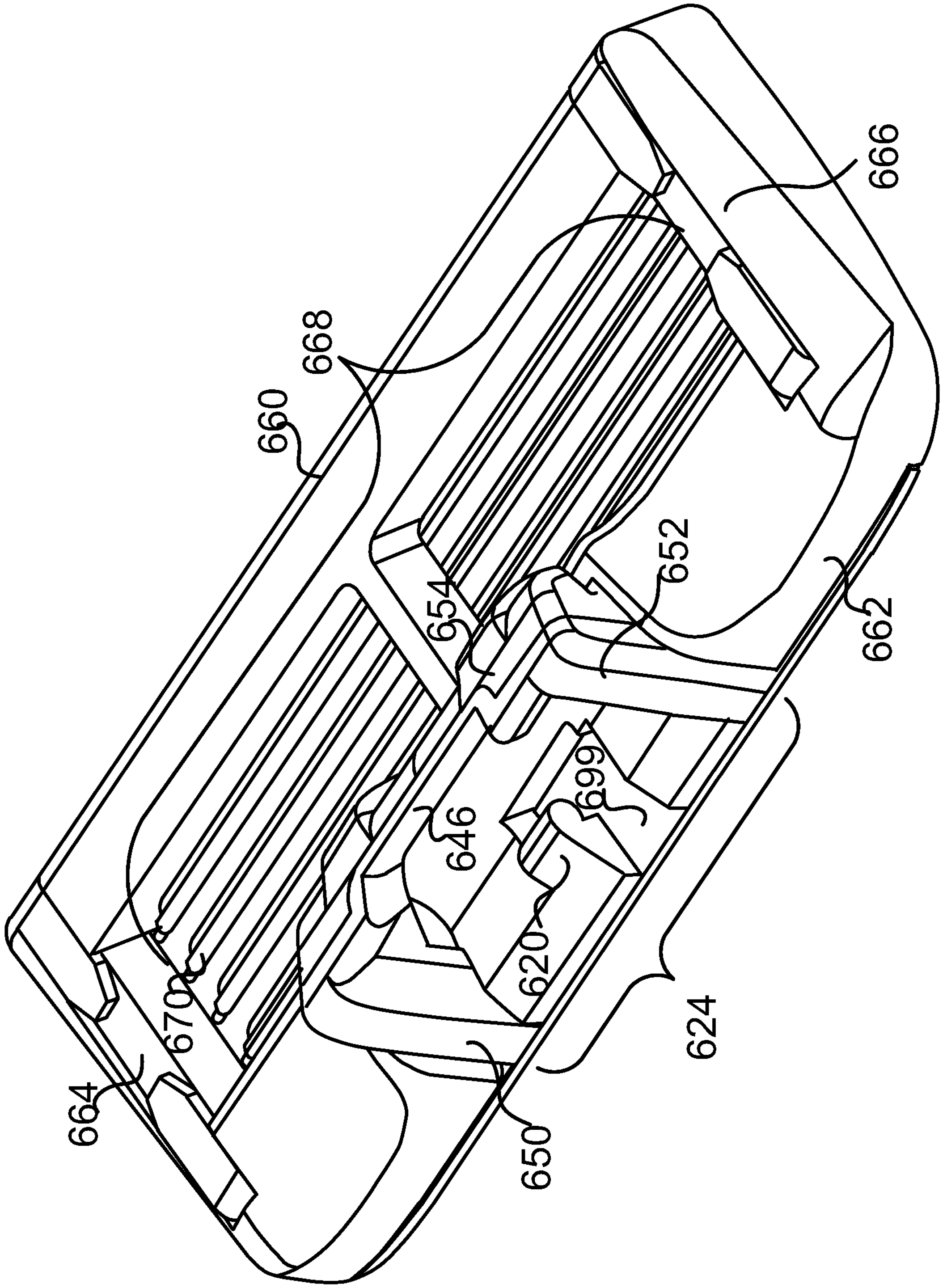
FIG. 6 is an example perspective of a cartridge according to certain embodiments described here.

FIG. 6 shows an example embodiment of a cartridge 604 and the receiver section 624 of the cartridge 604. Inside the receiver section 624, the tab 620 for engaging the single hook (not shown) as described herein, is shown along with the gap, space, well, or other empty region 699 where the single hook (not shown) may pivot into to disengage the tab 620 as described and release the cartridge 604.

Figure 10:
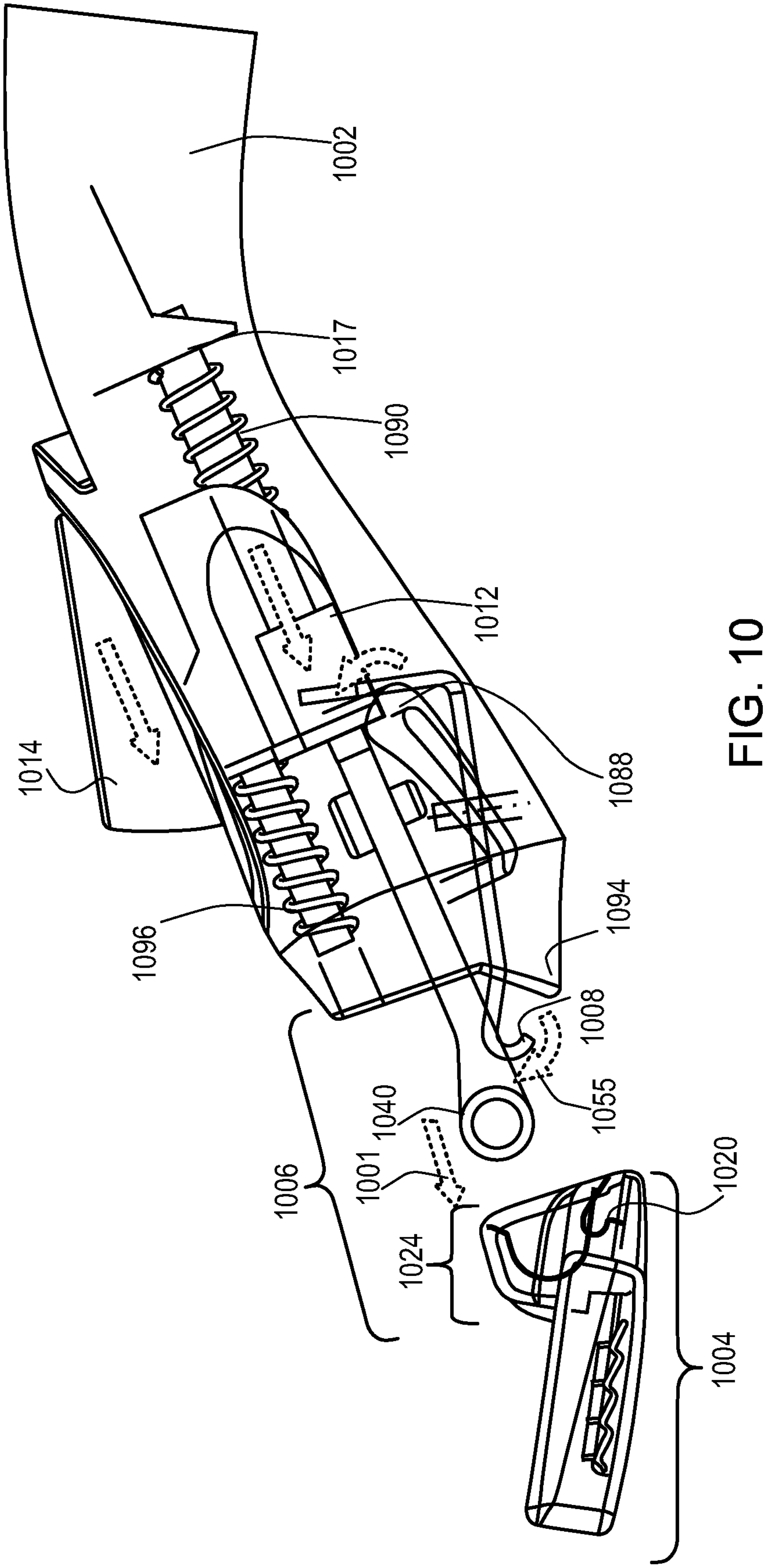
FIG. 10 is an example side illustration of a cartridge and handle docking according to certain embodiments described here.
Figure 11A:
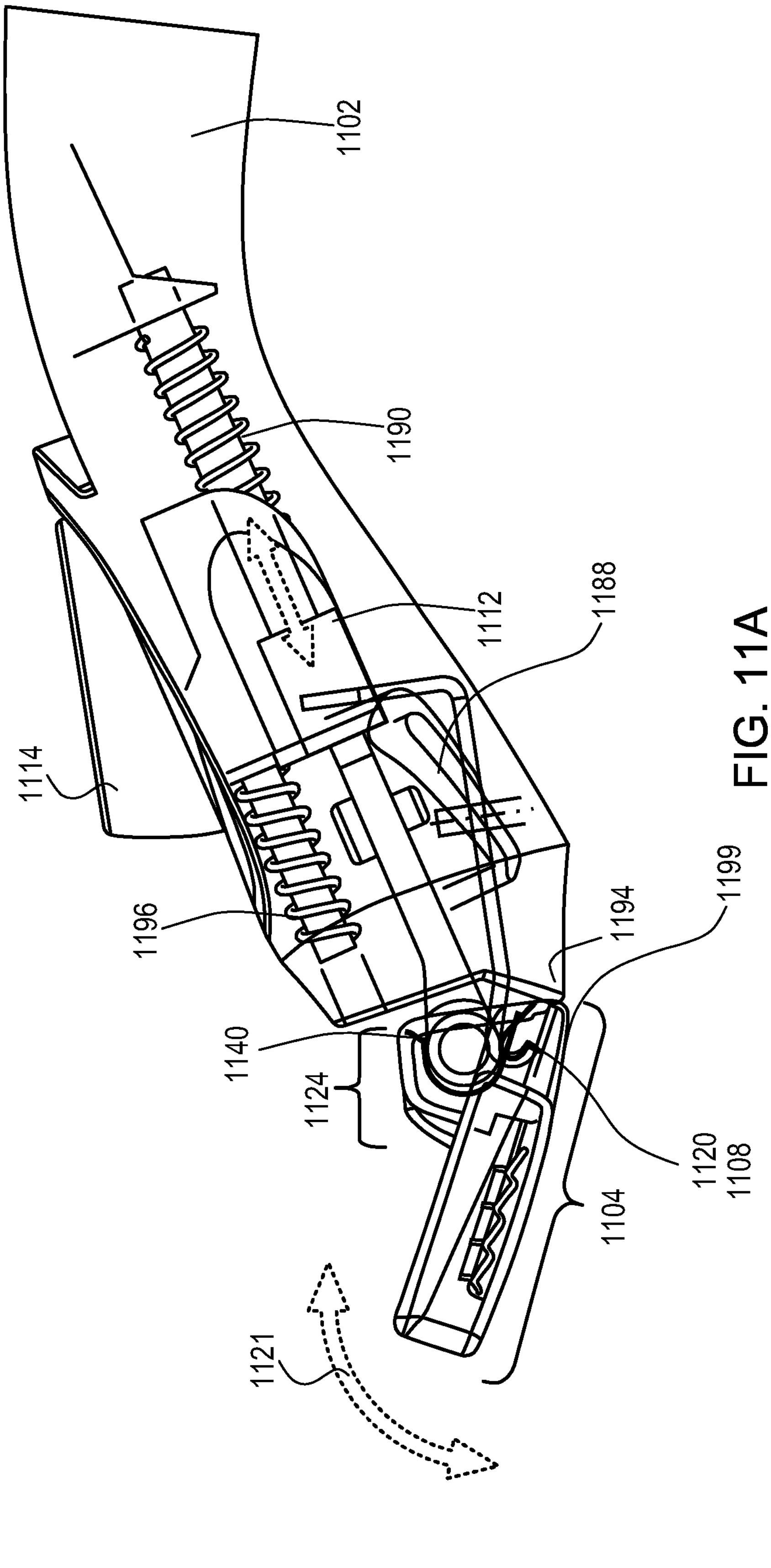
FIG. 11A is an example side illustration of a cartridge and handle docking according to certain embodiments described here.
Figure 11B:
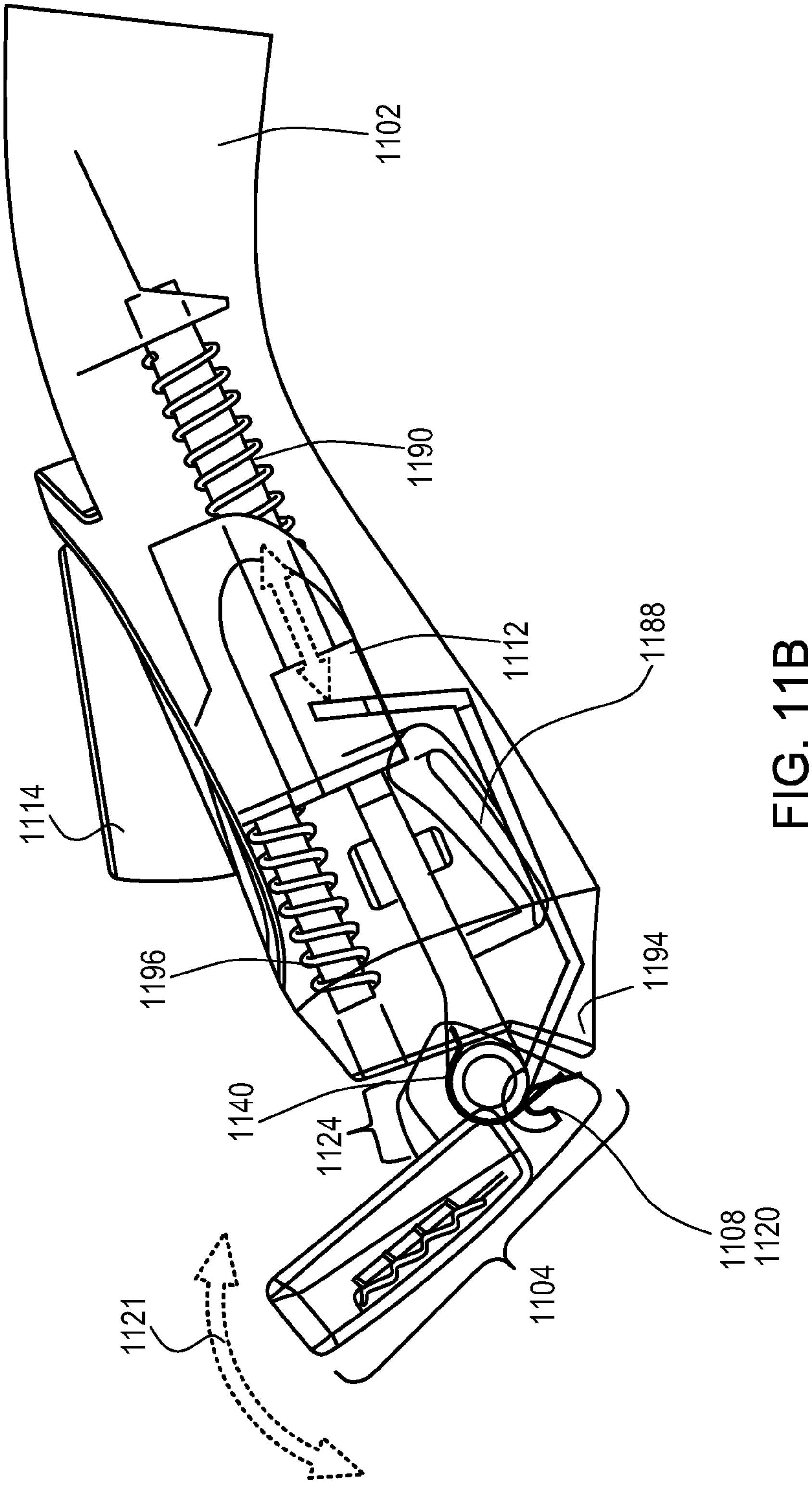
FIG. 11B is an example side illustration of a cartridge and handle docking according to certain embodiments described here.

The back side of an example cartridge 604 is shown in FIG. 6 which includes a top or cap side 660, a bottom or guard side 662, and a first side 664 and second side 666 surrounding a middle open section 668 where one or more blades 670 may be mounted. In some embodiments, the walls of the receiver section 624 may form a shape such as a basket or a well. In some examples, the receiver section 624 does not cover the open section 668 that includes one or more blades 670. The receiver section may include side walls 650, 652 and back wall 654 surrounding a void or other space 656 in some but not all directions. In some examples, one or multiple insides of the walls 650, 652, 654 of the receiver section 624 may be curved such as curved in a concave manner as shown, to fit the shape of the pushrod barrel (not shown in FIG. 6). In some examples the wall that is curved in a concave manner is the back wall 654 of the receiver section 624. In some examples, a cutout shape 646 is also included at the top of the back wall 654 wall of the receiver section 624. The cutout shape 646 is an example of one of various shapes that the walls of the receiver section 624 may take in order to affect the pivot travel for the handle by restricting the limits of movement of the pushrod and pushrod barrel. In some embodiments, instead of the cutout 646 the cartridge 604 may include a tab, an arch, or other shape that may interact with the pushrod and stop or limit the travel of the pushrod when docked with the cartridge 604. The receiver section 624 includes, inside the receiver walls 650, 652, 654, a central tab 620 in some examples, the central tab is ramp shaped 620 with a lower section and higher section. In some examples, next to the central tab 620 is a lower portion, or gap 699. (The central tab ramp shape interaction with a hook in the handle is shown in FIG. 10 and FIG. 11A and FIG. 11B.)

As described above, in some embodiments, the opening to the receiver section 624 may be made of a material or be coated with a material that is elastomeric, rubberized, lubricative, grippy, tacky, sticky, spongy, slippery, colored, and/or impact resistant. Such material may be made of latex, rubber, plastic, foam, polymer, or other material with such properties listed here. In some embodiments that may be the same material used in the guard bar of the front of the cartridge. This material for the coating of the receiver section may cushion the pushrod barrel when it is docked and provide a soft interface for the docking and pivot. In some examples, the material inside the receiver section 624 is the same color as the guard bar on the razor cartridge 604.

Docking System Examples

FIGS. 7A, 7B, 7C, and 7D show example illustrations of how the cartridge 704 may dock to the handle 702 with docking system 706 according to some embodiments.

Figure 7A:
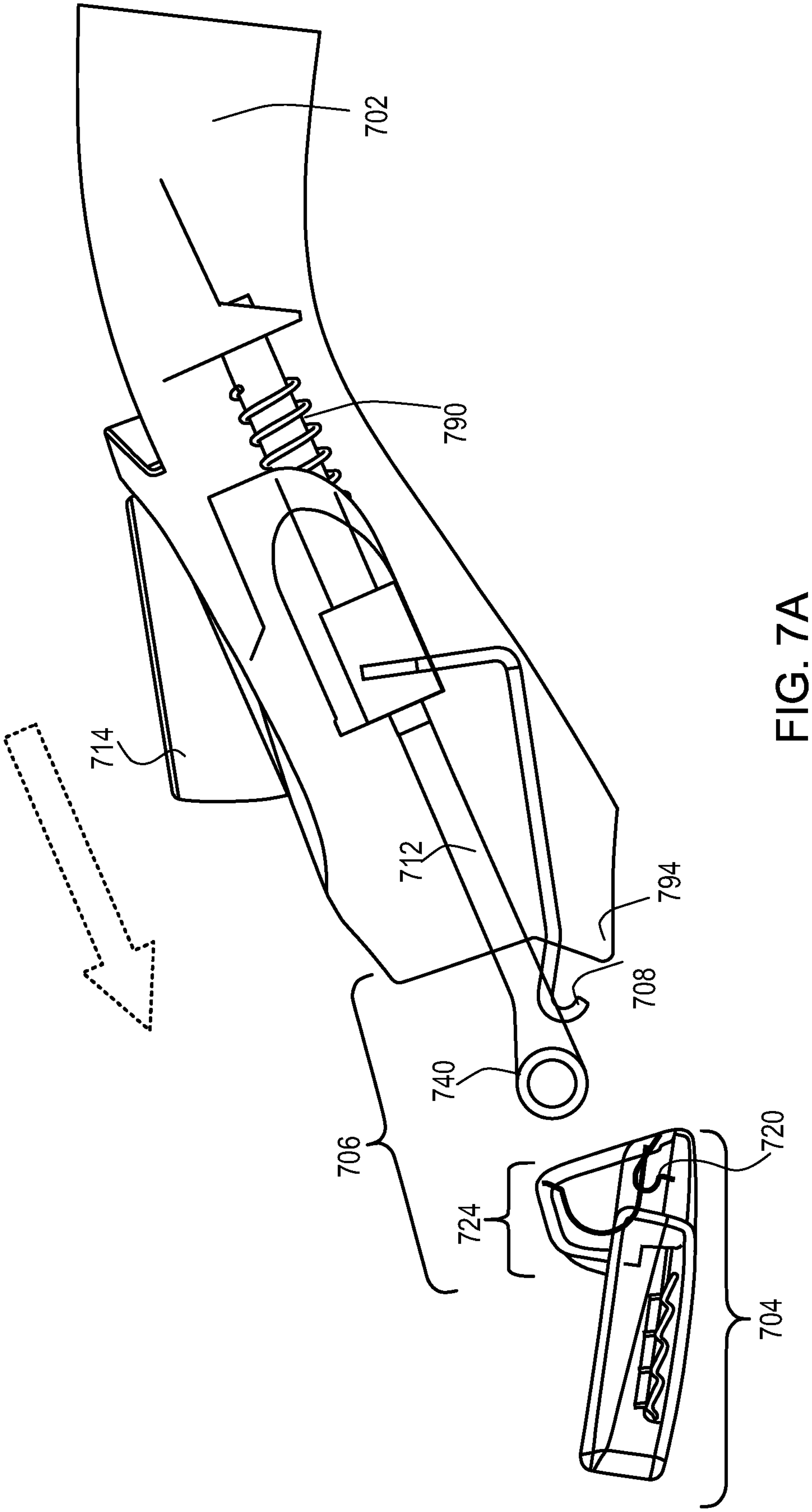
FIGS. 7A, 7B, 7C, and 7D are example side view illustrations of an example cartridge and handle docking steps according to certain embodiments described here.

First, in FIG. 7A, a user wishes to load or dock a new cartridge 704 onto the handle 702 with button 714. In its natural position, the pushrod 712 is shown extended because the spring 790 pushes the pushrod 712 in a direction away from the handle 702. The cartridge 704 is shown aligned with the handle 702 and the single hook 708 is shown in its natural position in the handle 702 which is closer to the handle 702 than the extended pushrod barrel 740 above taper section stopper 794.

Figure 7B:
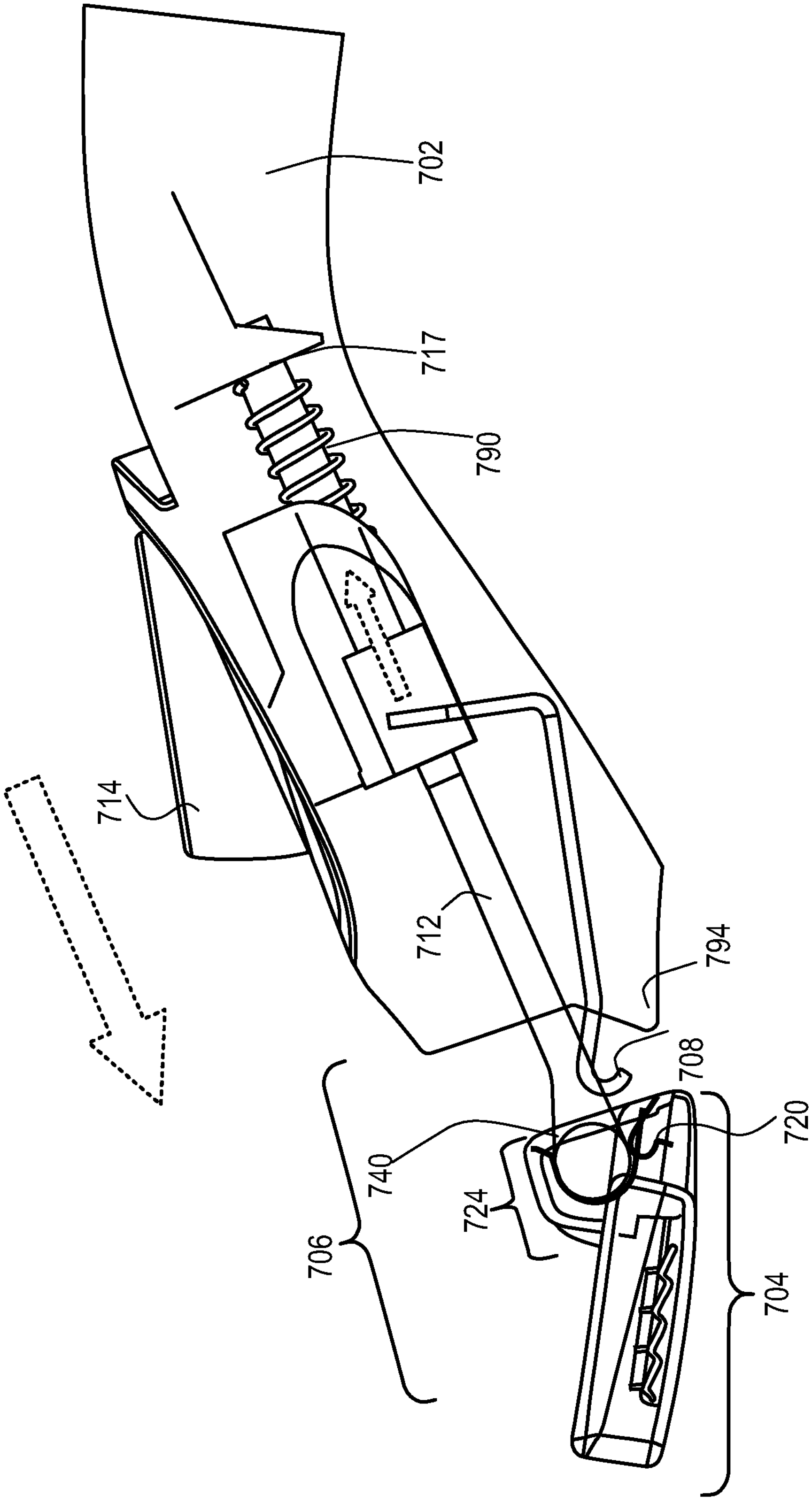

Next, in FIG. 7B, the example shows an illustration where the user has pushed the pushrod barrel 740 into the receiver section 724 of the cartridge 704. The pushrod 712 is still fully extended from the handle 702 due to the spring 790 force. Also, the single hook 708 is still resting in the handle 702 and has not yet come into contact with the cartridge 704.

In use, the cartridge 704 may be anchored in place by a tray or other packaging, so the handle 702 can be docked to the cartridge 704.

Figure 7C:
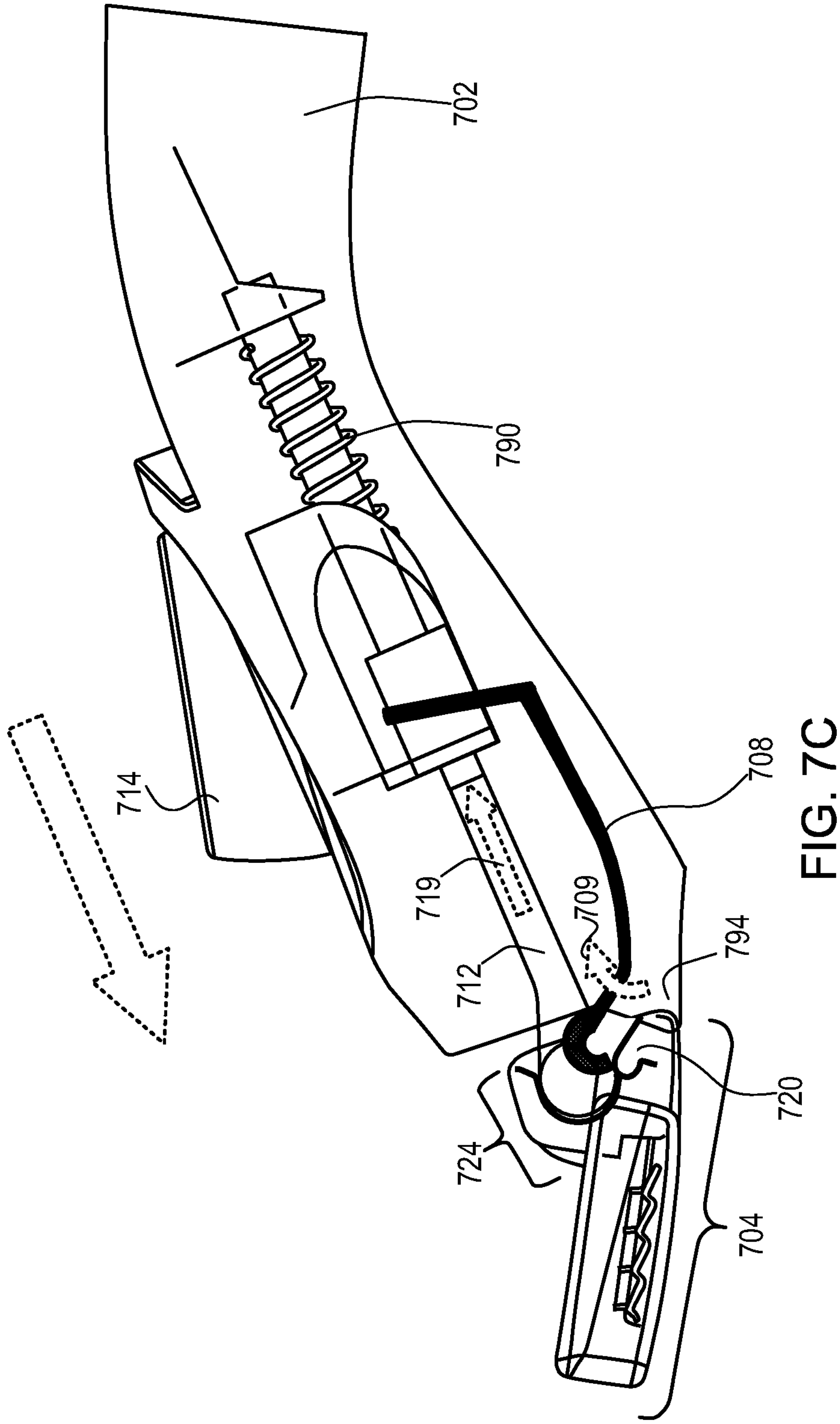

Then, FIG. 7C shows a scenario where a user has pushed the handle 702 farther toward the cartridge 704 thereby pushing the pushrod 712 up into the handle 702 against the spring 790 force. The single hook 708 (highlighted in black) is pushed to where it touches and engages a ramp on the tab 720 in the cartridge 704. As the handle 702 is pushed farther onto the cartridge 704, the single hook 708 flexes up as shown by arrow 709 as it bends over the tab 720.

Figure 7D:
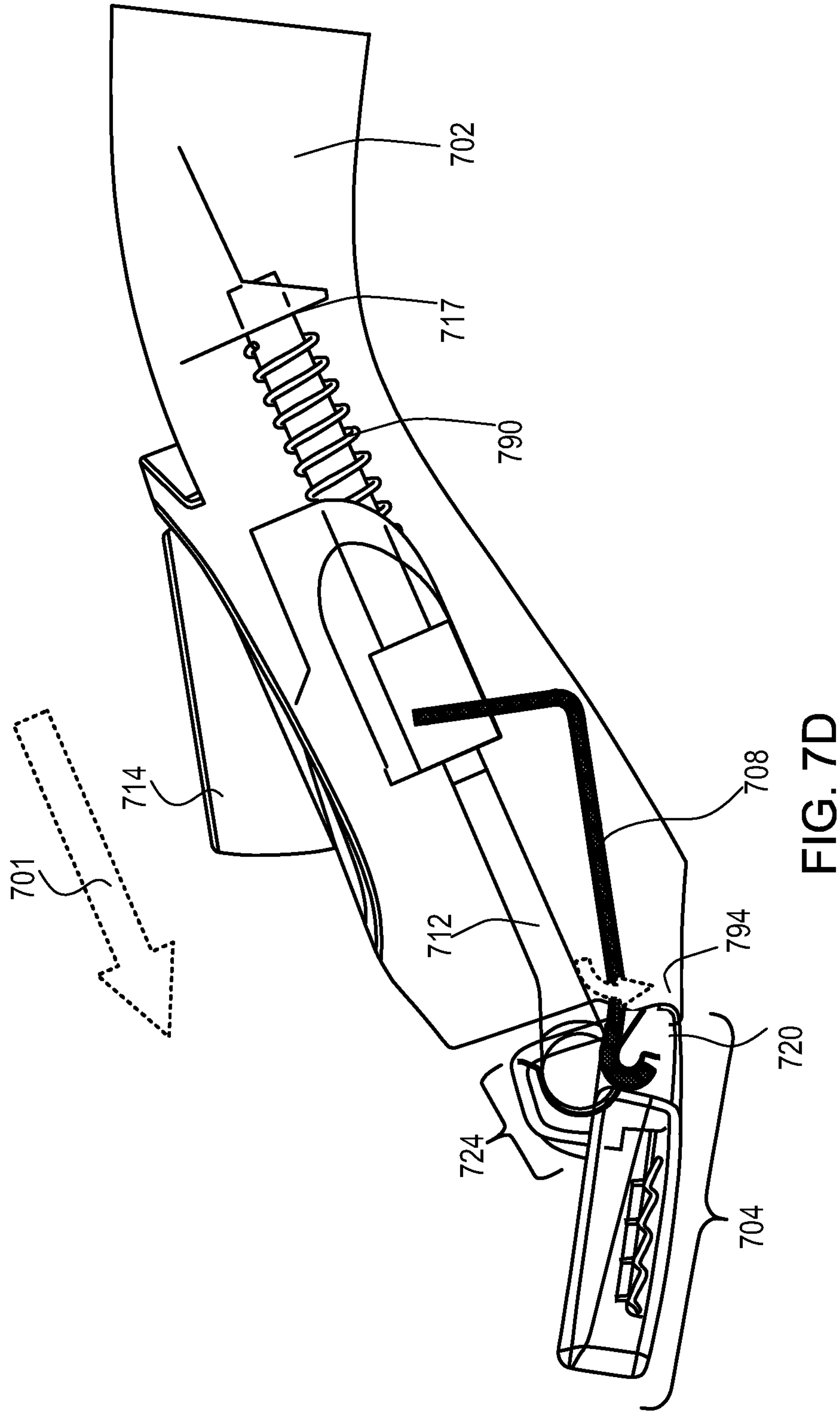

Finally, FIG. 7D shows an example where the single hook 708 is pushed in far enough to snap over the tab 720 and hold the cartridge head 704 to the handle 702. In FIG. 7D, the pushrod 712 is pushed far enough into the handle that the single hook 708 snaps over the tab 720. By snapping over the tab 720, the single hook 708 secures the cartridge 704 to the handle 702 and holds it against the spring force of the pushrod 712. In this docked position, the razor handle 702 and cartridge 704 may be used to shave a target of the user.

Figure 8:
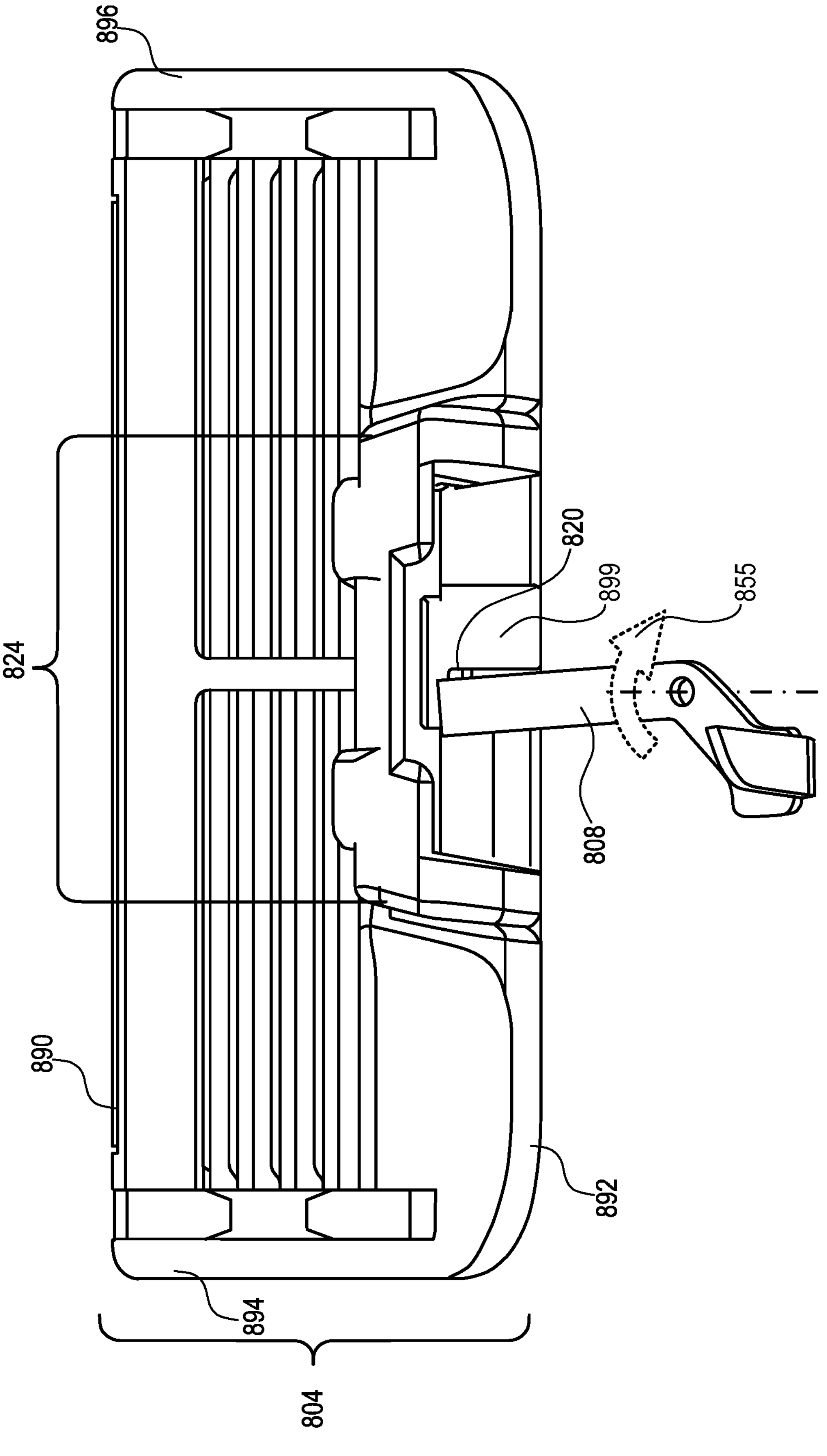
FIG. 8 is another example perspective illustration of a cartridge and portions of a docking mechanism according to certain embodiments described here.

FIG. 8 shows an example detail illustration without the handle but with only one part of the docking system connecting to a cartridge head 804. The docking system portion is just the single hook 808 in contact with and engaging the cartridge head 804 tab 820.

In docking the handle (not shown) to the cartridge head 804, the single hook may be pushed onto the cartridge 804 and deflect over the tab 820 and then snap into place over the tab 820. The single hook 808 remains centered on the handle by spring tension in a resting position in some embodiments and in some embodiments is pulled by a cam attached to either the button or pushrod. The single hook 808 may provide a pivot fulcrum for the cartridge pivot as the single hook 808 when docked, and exert a pulling force on the cartridge head 804 working opposite the pushing force of the pushrod.

At the same time in docking, in some embodiments, the pushrod (not shown) may fit into the receiver unit 824 and be forced back into the handle as the pushrod is spring biased to push out of the handle. In such examples, the pushrod may push the cartridge in a direction away until in a docking motion, the single hook 808 snaps over the tab 820 and holds the cartridge head 804 in place. The pushing force of the pushrod may act as the return force for the cartridge head when deflected by a user in use in a pivoting use situation.

Figure 9:
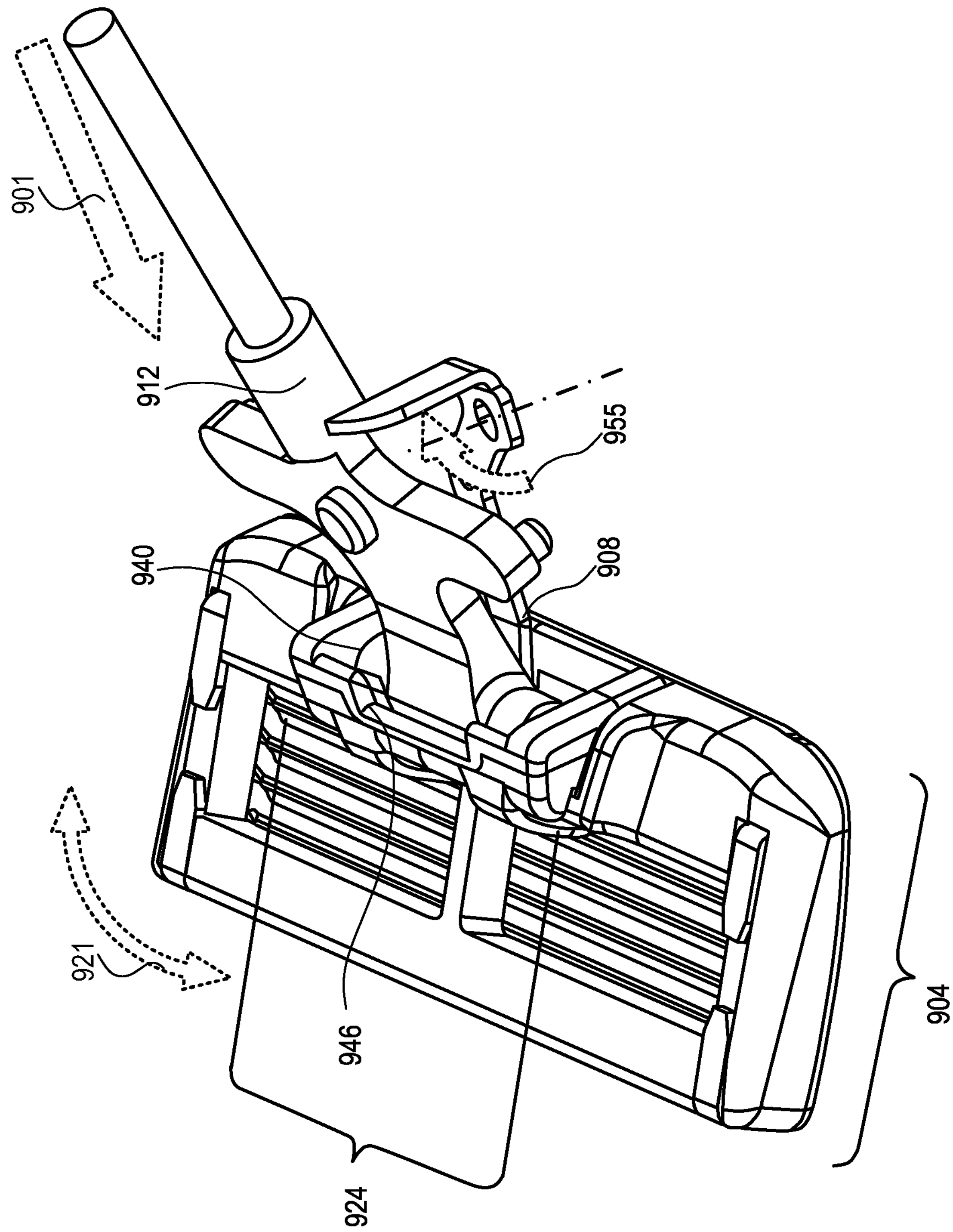
FIG. 9 is another example perspective illustration of a cartridge and portions of a docking mechanism according to certain embodiments described here.

FIG. 9 shows an example perspective illustration of the cartridge head 904 engaged or docked with the pushrod 912 and the single hook 908 but does not show the rest of the handle. In FIG. 9 the pushrod barrel 940 is shown engaged with the receiver section 924 of the cartridge 904. The single hook 908 is also shown engaged with the tab (obscured) of the cartridge 904. The pushrod 912 push arm 942 is also shown. In this engaged, docked configuration, the handle would be attached to the cartridge head 904 for shaving operation.

In some examples, the pushrod 912 may be spring loaded and the pushrod barrel 940 would exert a pushing force in a direction away from the handle by pushing on the receiver section 924. This pushing spring force may be the return force when the cartridge head 904 pivots back toward the handle when in use. A combination of the single hook 908 flexing and the pushrod pushing out, would allow the cartridge head 904 to pivot around the fulcrum of the point where the single hook 908 interacts with the receiver section 924 at the tab (obscured) to pivot in use.

When in this docked position as shown in FIG. 9, the single hook 908 may exert a pulling force on the tab and thereby the front guard portion of the cartridge 904 due to the spring force of the single hook 908 flexing. This pulling force may hold the cartridge in an upright position as the pushrod 912 exerts a constant pushing force on the cartridge head 904 receiver section 924 which is located behind the single hook 908.

In some embodiments the walls of the receiver section 924 may be shaped to allow the pushrod 912 to pivot back and forth as shown by the arrow. The shape of the receiver section 924 walls may limit the travel arc for the pivot of the pushrod 912 and thereby the handle when the walls of the receiver section 924 hit the pushrod 912 barrel 940. In some embodiments, a cutout 946 may be built into the top portion of the receiver section 924 to allow the pushrod 912 to pivot.

In some embodiments, the receiver section 924 of the cartridge 904 may include portions with coatings or be made of a particular material. Such coatings or material may be elastomeric, rubberized, lubricative, grippy, tacky, sticky, spongy, slippery and/or impact resistant. Such material may be made of latex, rubber, plastic, foam, or other material with such properties listed here. Such material may be a different color from the cartridge head generally 940, may be the same color as the guard bar (not shown), and/or be made of the same material as the guard bar. If colored, the material may help guide or otherwise highlight the receiver section 924 for a user. In this way, when docking, the user can easily see where to dock the handle and push the pushrod barrel 940 into the receiver section 924 and be cushioned by the elastomeric coating. Such material in the receiver section 924 may cushion or lubricate the pushrod 912 barrel 940 when interacting during docking.

As discussed, the inside of the receiver section 1024 may be coated in or be made of a material that can help cushion the pushrod 1012 or otherwise lubricate its movement after it is docked.

Cartridge Release/Ejection Examples

FIG. 10 is a side view of FIG. 2 and a similar view of FIG. 7A. FIG. 10 shows the handle 1002 with taper section stopper 1094 ejecting the cartridge 1004. When a user pushes the button 1014 forward, compressing button spring 1096, the button cam 1088 pivots the single hook 1008 as disclosed in FIG. 8 and as shown by the arrows in FIG. 10. This pivot of the single hook 1008 disengages the single hook 1008 from the tab 1020 in the cartridge 1004. Once the single hook 1008 disengages the cartridge head 1004, there is no force holding the pushrod 1012 in the handle, and the spring 1090 is able to push the pushrod 1012 forward and out away from the handle 1002. The forward motion of the pushrod 1012 flicks, flings, or otherwise pushes the cartridge 1004 away from the handle 1002 at a rate of speed that is enough to dislodge the pushrod barrel 1040 from the receiver section 1024 and thereby completely disengage the cartridge 1004 from the docking section 1006 of the handle 1002.

As can be seen from the figure, after ejection of a cartridge, the pushrod 1012 is in its extended position, pushed by the spring 1090 out beyond the single hook 1008.

To show another detail example of the ejection sequence, focusing just on the handle and turning again to FIG. 5, in a cartridge release situation, the button (not shown) may be pressed forward by a user as described. This button movement may move an attached cam 588 forward and thereby pivots the single hook 508 to one side as shown by the arrows. The single hook 508 is shown with a pivot axis 510 to anchor it to the handle 502 and when pushed by the cam 588, to pivot to the side as depicted in FIG. 5. Because, in some embodiments, the pushrod 512 is always exerting a force out, away from the handle 502, once the single hook 508 disengages with the cartridge (not shown) the pushrod 512 is able to push off the cartridge (not shown) from the handle 502 by the pushing spring 590 force as described herein.

In some embodiments, after ejection, the single hook 508 is then returned to the center position by a separate spring (not shown) that pulls or pushes the back of the single hook 508 in the opposite way that the cam 588 pushed it to release. Alternatively or additionally, in some embodiments, the single hook 508 is pulled back to the center position by a second cam (not shown) attached to either the pushrod 512 or the button (not shown). The second cam (not shown) could interact with the single hook 508 in the opposite way that the first cam 588 would and pull the single hook 508 to the center when the handle is in a resting position.

To show another detail example of the ejection sequence, focusing just on the single hook's engagement of the cartridge, and turning again to FIG. 8, to release the cartridge, a user may push the button (not pictured) forward on the handle (not pictured) causing the single hook 808 to pivot to the side as shown and disengage the tab 820 on the cartridge head 804 as shown by moving into the gap 899. When the single hook 808 is in the gap 899 and not engaged to the tab 820, there is nothing left to hold the pushrod (not pictured) back and its spring pushes the pushrod forward to disengage the handle and cartridge 804. FIG. 8 also shows the top of the cartridge with the top of the cap showing 890, the bottom of the cartridge with the bottom of the guard bar showing 892, and the two sides 894, 896 of the cartridge.

The receiver section 824 example in FIG. 8 is constructed in a pocket shape or cavity which can receive the pushrod barrel (not shown) and the single hook 808 to dock the cartridge 804 to the handle (not shown). The receiver section 824 may include walls that keep the pushrod barrel held within the receiver group 824 even during operation when forces are applied to the cartridge 804 and handle. In some example embodiments, the receiver section 824 is coated in material or made of material with cushioning or lubricating properties. In some examples, the receiver section material is the same material as the guard bar on the front of the cartridge 804. The receiver section material could be any number of materials such as but not limited to, plastic, resin, foam, soap, rubber, latex, polystyrene, or other material. In some examples the material has properties such as feeling slippery when water is applied. Alternatively or additionally, in some examples, the material may have lubricative properties when dry and in some examples when wet, in some examples, the material may emit a pleasing odor dry or when water is applied. Alternatively or additionally, in some examples, the material may be water soluble and/or dissolve in water in order to lubricate the pivot action as described herein.

Pivot Examples

FIG. 11A shows a side view example of the handle 1102 and cartridge 1104 after the two are docked. In FIG. 11A, the pushrod barrel 1140 is engaged into the receiver section 1124 of the cartridge 1104 and exerting a pushing force on it while the single hook 1108 is engaged with the tab 1120 and is holding the cartridge 1104 to the handle 1102.

In use, a user may exert an external force on the end of the cartridge 1104 during a shaving stroke. Such a force may cause the cartridge 1104 to pivot backwards and toward the button 1114 side of the handle 1102. When the external force is lessened or removed, the cartridge head 1104 may return to its normal position, upright, forward, and/or away from the button 1114 side of the handle 1102.

The single hook 1108 may secure the tab 1120 and act as a fulcrum of the cartridge 1104 pivot. The pushrod barrel 1140 mounted in the receiver section 1124 may also act as a fulcrum of the pivot in some embodiments. The single hook 1108 may also exert a pulling force to counteract the pushing force by the pushrod 1112.

When in use, the cartridge 1104 may pivot as shown by the arrows. The pivot back may be caused by the user applying a force to the end of the cartridge 1104 during a shaving stroke. In some embodiments, the system is designed to spring back, that is, return to an upright position as shown herein. The spring force of the pushrod 1112 pushing out from the handle 1102 and into the cartridge head 1104 may serve in some embodiments as the return force for cartridge 1104 when it is pivoted backwards in use. In some embodiments, the single hook 1108 on the bottom of the cartridge head 1104 may also impart a pulling return force to pull the cartridge head 1104 upright when it is pivoted backwards in use. In some example embodiments, the single hook 1108 may flex during a pivot, which may also add a force to return the cartridge head 1104 when the external pivot force is removed.

The limits of travel of the cartridge head 1104 pivot may be constrained by the walls of the receiver section 1124 and the taper section stopper 1194. As the pushrod 1112 exerts a constant force forward, or away from the handle 1102 and the single hook 1108/tab 1120 intersection acts as the fulcrum, the cartridge head 1104 would flip completely forward and off the single hook 1108 if it were not stopped by the edge of the handle 1102 at the taper stopper section 1194. This taper stopper section 1194 may interact with the guard of the cartridge 1104 to stop it from flipping completely forward from the force of the pushrod 1112.

FIG. 11B shows a side view of an example handle 1102 and cartridge 1104 which are docked and where the cartridge 1104 is pivoted backwards. In the example figure, the single hook 1108 and tab 1120 are coupled and act as the fulcrum around which the pivot motion occurs. The pushrod 1112 pushes out from the handle 1102 but is spring loaded 1190 so may be pushed back into the handle 1102 by the backwards pivot force exerted by a user during operation. The pushrod 1112 and the barrel 1140 exert a force on the receiver section 1124 which is behind the tab 1120 and single hook 1108. Thus, the cartridge head 1104 may hinge backwards and pivot around these two interacting forces. The pushrod 1112 spring force may return the cartridge head 1104 to a resting forward position after the backwards pivot force is removed from the cartridge head 1104. In some embodiments, the limit of the forward position of the cartridge head is the taper ledge 1194 on the handle 1102 interacting with the guard portion of the cartridge 1104.

Figure 12:
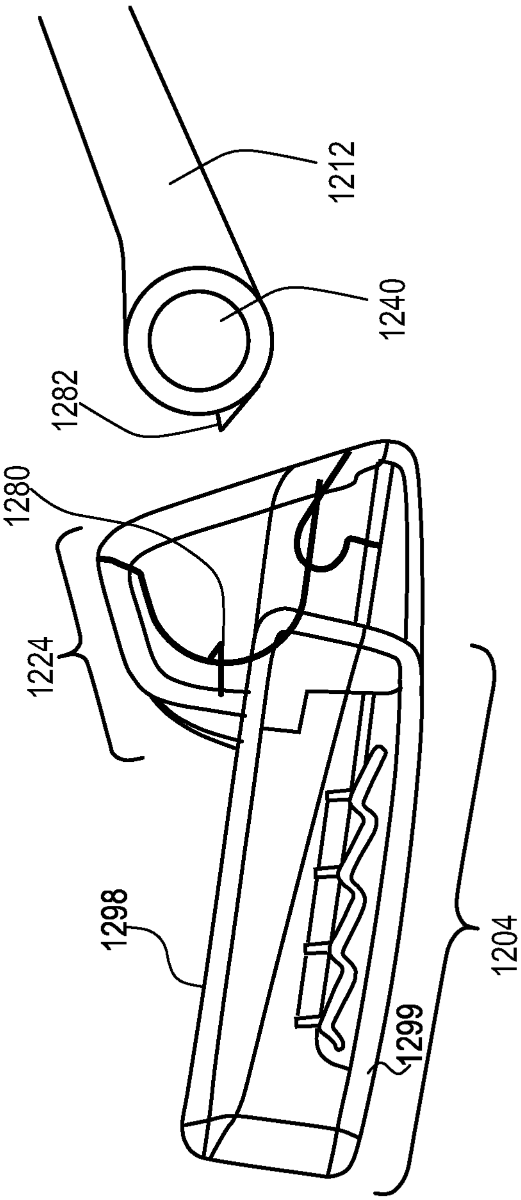
FIG. 12 is an example side illustration of a cartridge and portion of a handle docking according to certain embodiments described here.

FIG. 12 shows an example detail embodiment of the cartridge 1204 with a back side 1298 and a front side 1299 and the pushrod 1212 but with an alternative or additional structure to help stop the cartridge head from flipping too far forward due to the force of the pushrod 1212. In FIG. 12, the pushrod 1212 barrel 1240 includes a stopper step, tooth, or other structure 1282 integrated onto its top. In some embodiments, the pushrod barrel 1240 is built with a tooth or step 1282 on the pushrod barrel 1240 that is a different radii from the barrel 1240 itself. That is, in some examples a tooth or step 1282 may protrude from the pushrod barrel 1240 to interact with the inside of the receiver section 1224 which can include a complementary, counter-matching step or tooth structure 1280. Such a structure on the pushrod barrel 1240 and receiver section 1224 could interact to stop the forward motion of the cartridge head 1204 beyond the tooth/step interaction 1280/1282 but would not impede the rearward pivot of the cartridge head 1204 during operation as described above.

In some embodiments, the tooth/step 1282 could be a ridge that runs around the pushrod barrel 1240. In some examples, the tooth/step 1280/1282 may be arranged in the middle of the barrel 1240/receiver section 1224 so as not to impede a docking or ejection sequence.

Cartridge Force Examples

Figure 13:
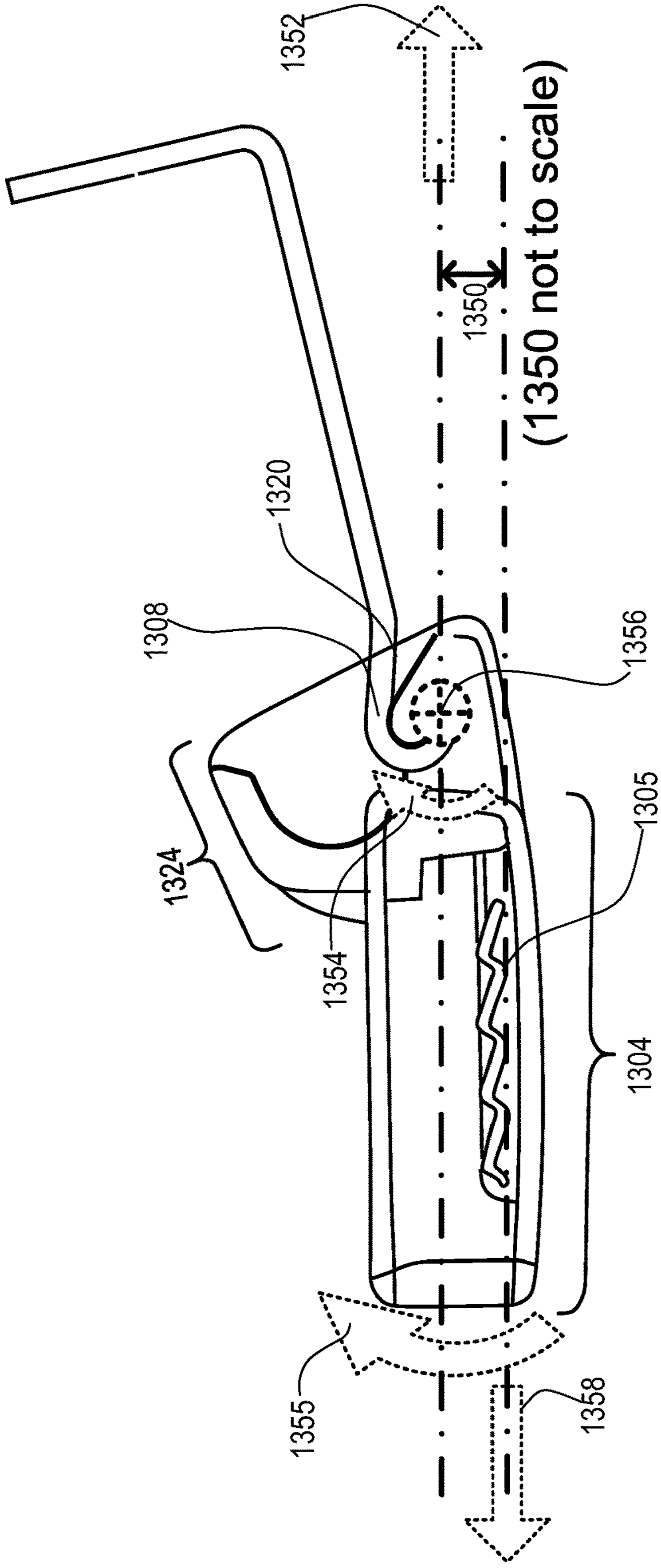
FIG. 13 is an example side illustration of cartridge forces according to certain embodiments described here.

FIG. 13 shows an example cartridge 1304 with the tab 1320 coupled to the single hook 1308 from the handle docking system. The example in FIG. 13 shows how the arrangement of these affect the cartridge head as it moves in operation in a static forces diagram.

As can be seen on FIG. 13, the arrangement of the receiver section 1324 is pushed as far away from the blades 1305 in order to allow for rinse through of the cartridge 1304. But pushing the docking system, in this case, the receiver section 1324 down toward one end of the cartridge 1304 can impart forces on the cartridge during operation as described herein.

In a shaving operation, a user would hold the handle (not shown) and pull the razor cartridge 1304 across the target that they are shaving. This pulling motion would act on the cartridge head 1304 about the point 1356 (symbol drawn for illustrative purposes only, not a structure) in the docking system which in the example of FIG. 13 is the point where the tab 1308 on the cartridge 1304 touches the single hook 1320 attached to the handle. During a shaving stroke, the pulling 1352 of the cartridge 1304 across a target causes the blades 1305 to cut hairs. The cumulative forces of the blades cutting hairs results in an opposing force 1358 which can be modeled as a resultant force from the friction forces of the target hair on the razor blades 1305.

The distance between the user pulling force 1352 on the fulcrum 1356 and the pulling friction force 1358 on the blades 1305 is a distance 1350. This distance 1350 between the parts of the cartridge 1304 that these two forces act upon, creates a moment force 1354 about the fulcrum 1356. This moment force 1354 creates a twisting or torque force about the fulcrum 1356 that twists the end of the cartridge 1304 in a clockwise motion as seen from the view of FIG. 13. (If viewed from the opposite side, the torque twist would be counter-clockwise.) This resulting torque twist force 1354 in a shaving stroke may cause the cartridge 1304 to pivot back and away from the target that is to be shaved. The result of this torque twist force 1354 on the cartridge head 1304 during a shaving stroke may result in less contact of the blades 1305 on the target due to skipping, lifting, or missing hairs as the blades 1305 are pulled across the target. How much skipping and missing would depend on how much torque twist force is imparted during a shaving stroke.

As the moment force on the fulcrum 1356 can be calculated as:

$$M=F\times d$$

where F is the friction force of 1358 by the blades and d is the distance 1350 between the fulcrum 1356 and the friction blade force 1358, it can be seen that the larger the distance, d, between the fulcrum 1356 and the plane of the blades 1305, the larger the moment force multiplier and the larger the resulting torque twist force 1354 imparted on the fulcrum 1356. Thus, to help minimize or lessen the torque twist force 1354 on the cartridge 1304, the distance d, 1350 can be minimized in the arrangement of the cartridge 1304.

In the arrangement of the example embodiments in this disclosure, the distance 1350 between the fulcrum 1356 of the single hook 1308 and tab 1320 and the blades 1305 which impart the friction force 1358, can be minimized to as little as 0.7 mm. This minimal distance may be achieved by the arrangement of the receiver section 1324 low on the cartridge 1304 and the arrangement of the tab 1320 inside the receiver section 1324. Such an arrangement, in some embodiments, can minimize the distance 1350 to between 0.3 and 0.8 mm. In some examples it is less than 1 mm. In some examples, the distance can be zero or near zero. This minimal distance in the embodiments disclosed here may result in a better shave with less skipping, less torque twist 1354 on the cartridge 1304, and a better pull 1352 across the target skin and hair.

Double Hook Examples

Figure 14A:
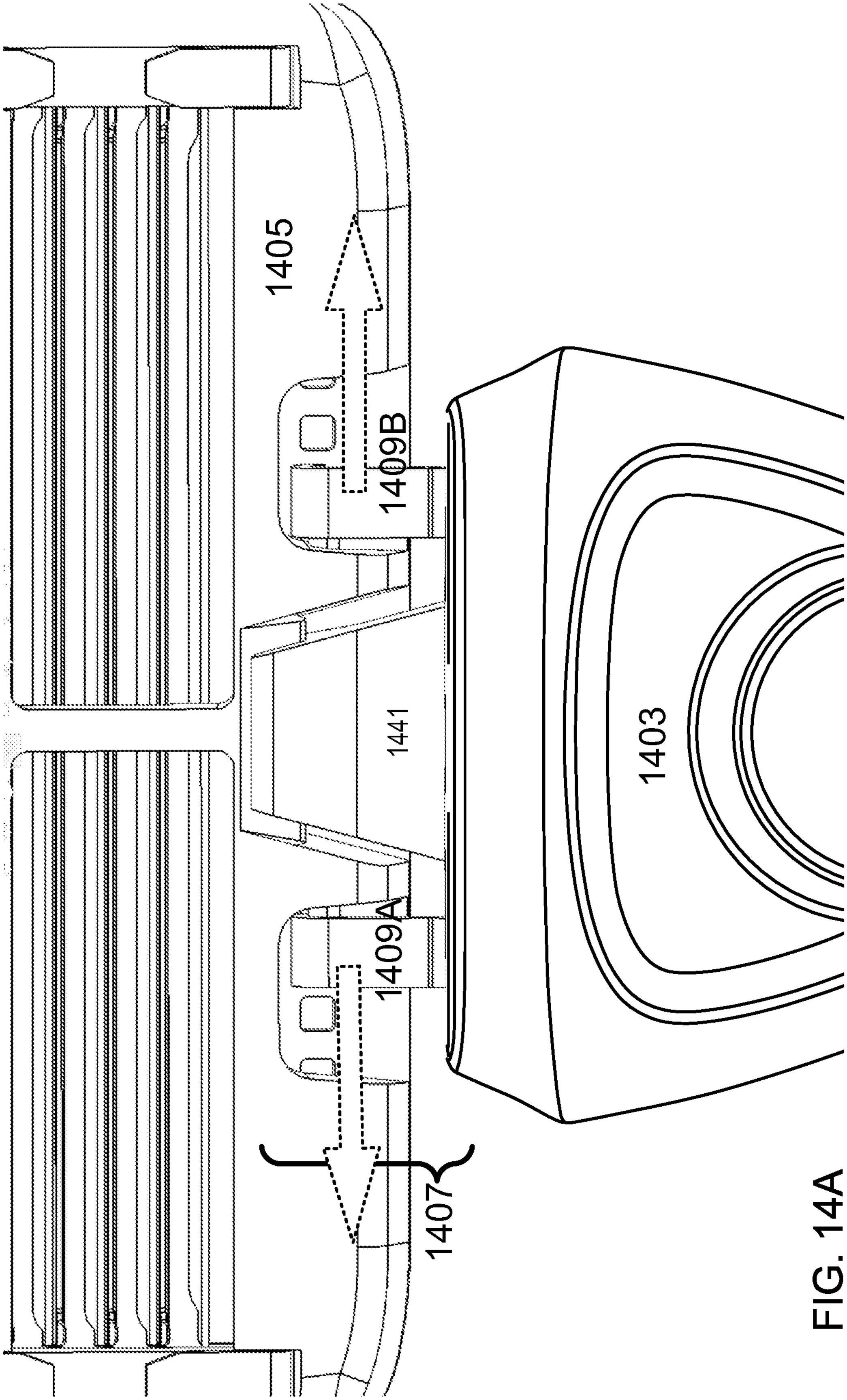
FIG. 14A is an alternate example illustration of a cartridge and portions of a docking mechanism according to certain embodiments described here.

FIG. 14A shows an alternative embodiment docking system, where instead of a single hook to hold the handle to the cartridge, two hooks 1409A, 1409B are used which oppose one another, and hook onto two tabs on a cartridge 1405 in a similar fashion to the single hook. In such example embodiments, the single pushrod 1441 may dock similarly to how it docks as described here, but instead of a single hook, under the pushrod, two hooks 1409A, 1409B may attach to two tabs on the cartridge 1405. Such hooks 1409A, 1490B may be arranged to pivot in a direction out and away from their respective tabs (shown by the arrows) when the button is pushed. The rest of the system may be similarly constructed with a spring loaded pushrod that can hold and eject the cartridge. A similar receiver section and pivot arrangements can be configured with two hooks instead of one as shown in FIG. 14A.

Figure 14B:
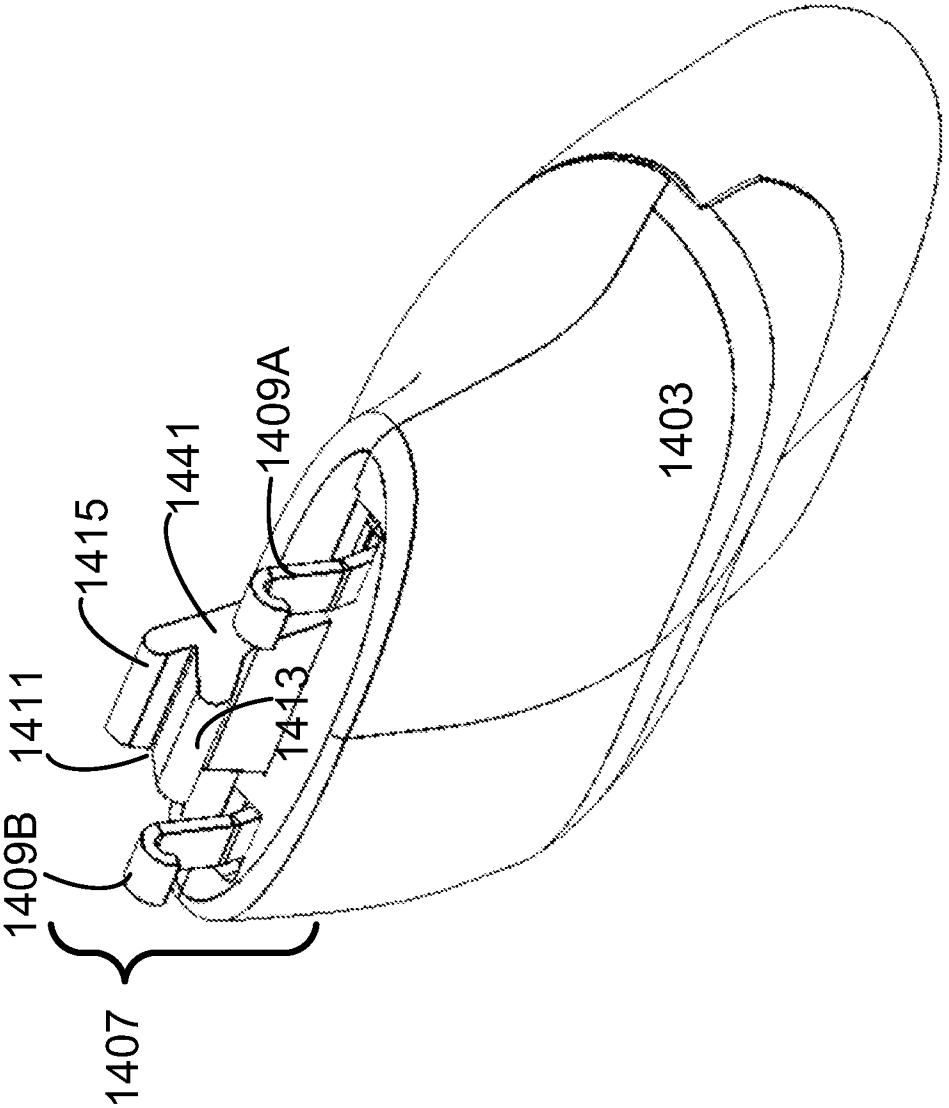
FIG. 14B is an alternate example illustration of a docking mechanism according to certain embodiments described here.

In alternate embodiments with two hooks as shown in FIG. 14A, the pushrod 1441 may include a Y shaped structure that can be used to limit the pivot of the cartridge as shown in FIG. 14B. FIG. 14B shows an example perspective of the handle 1403 and docking system 1407 without a cartridge. The opposing hook portions 1409A, 1409B are shown on either side of the pushrod 1441. The pushrod 1441 shows the Y shaped pivot 1411 and the branch 1413 that fits under the cartridge wedge as well as the branch that fits over or on top of 1415 the cartridge wedge (not shown) when docked. When the button (not shown) is pressed, and the docking system 1407 is actuated to eject a cartridge, opposing hook portions 1409A, 1409B, pivot away from the centerline of the handle 1403 that is, away from the pushrod 1441 and allow the pushrod 1441 to release its spring force and push away or eject the cartridge as described herein.

Figure 14C:
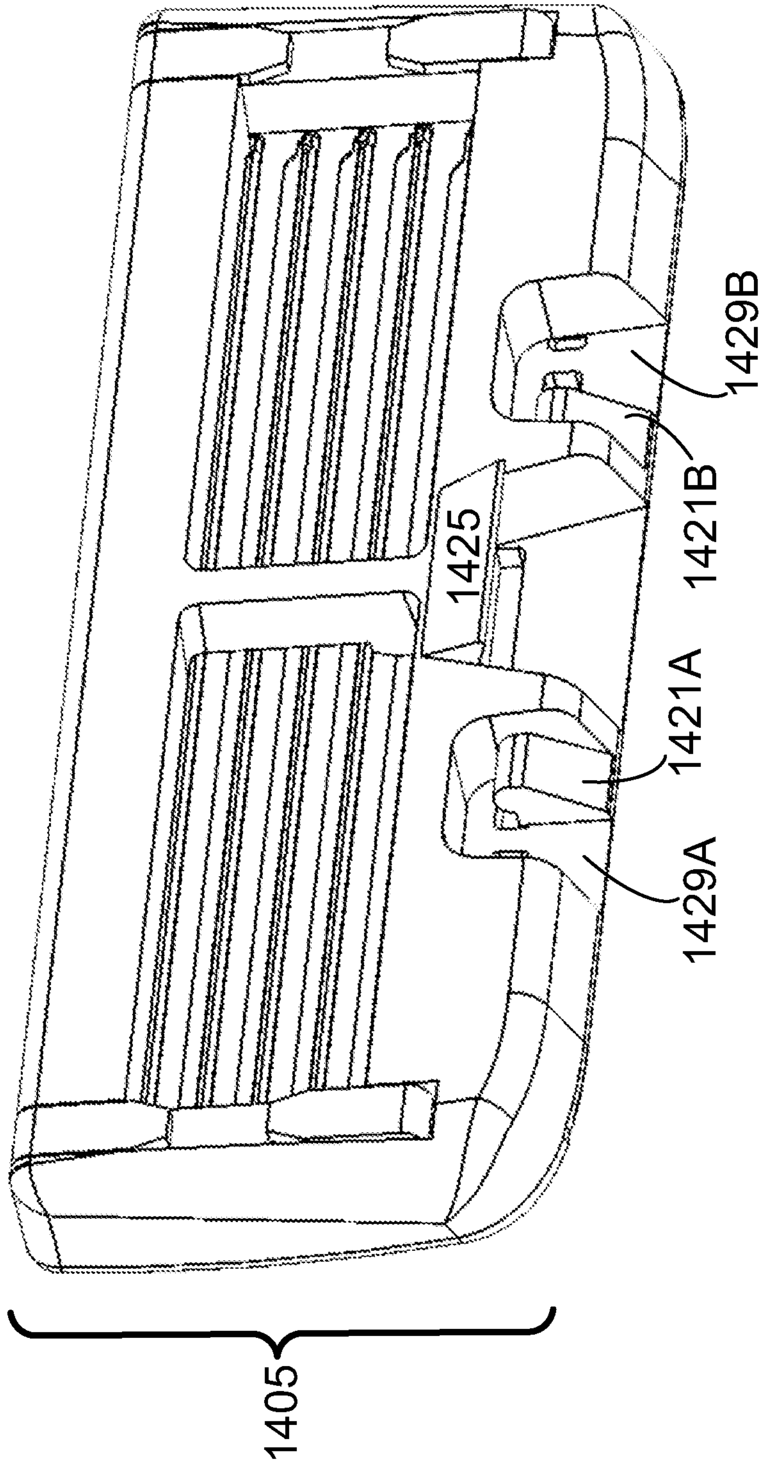
FIG. 14C is an alternate example illustration of a cartridge according to certain embodiments described here.

FIG. 14C shows a perspective of an example razor cartridge head 1405 according to this alternate embodiment, without the docking mechanism. FIG. 14 shows the tabs 1421A and 1421B on the cartridge 1405 which may engage with the two opposing hook portions (not shown) of the docking mechanism (not shown) when the razor cartridge 1405 is docked to the handle. These tabs may be hooked by the two opposing hook portions to keep the cartridge head 1405 attached to the handle during operation.

When the cartridge 1405 is docked, the two opposing hook portions of the docking mechanism are pressed against the ramps of the tabs 1421A, 1421B and the two opposing hook portions deflect over the tabs 1421A, 1421B and then snap into place, engaging the tabs 1421A, 1421B and holding the cartridge 1405 to the handle.

When the cartridge is ejected, the two opposing hook portions would move away from these tabs 1421A, 1421B toward the outside of the cartridge 1405 and into spaces 1429A, 1429B in the cartridge 1405 next to the tabs 1420 thereby releasing the cartridge 1405 from the docking mechanism. The pushrod would extend by spring force and press against the wedge 1425 to push or eject the cartridge 1405 away from the handle as the two tabs 1421A, 1421B are disengaged by the two opposing hook portions of the docking mechanism.

The wedge 1425 on the cartridge 1405 may engage with the Y shaped portion of the pushrod pivot (FIG. 14B) when the cartridge is docked. In this embodiment, it is this wedge 1425 which may limit the motion of the cartridge pivot by engaging and contacting the two branches of the Y (FIG. 14B) of the pushrod in the two limits of the pivot motion. The wedge 1425 may also interact with the pushrod when the cartridge is ejected when the two opposing hook portions disengage from their respective tabs 1421A, 1421B.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the embodiments have been specifically described herein, it will be apparent to those skilled in the art to which the embodiments pertain that variations and modifications of the various implementations shown and described herein may be made without departing from the spirit and scope of the embodiments. Accordingly, it is intended that the embodiments be limited only to the extent required by the applicable rules of law.

What is claimed is:

1. A razor system, comprising:

a razor handle elongated body, wherein the razor handle elongated body includes a back end opposite a docking end;

a central pushrod mounted in the docking end of the razor handle elongated body, wherein the central pushrod is generally double T-shaped with two shorter bars perpendicular to a longer bar, the longer bar of the generally double T-shaped central pushrod aligning with the razor handle elongated body and slidably mounted into the docking end;

wherein a first bar of the central pushrod shorter bars, perpendicular to the longer bar, is configured outside the docking end and a second bar of the central pushrod shorter bars is configured inside the docking end;

one central hook arm pivotally mounted to the razor handle body at the docking end, within and proximal to the generally double T-shaped central pushrod, wherein the central hook arm includes a pivot end and a hook end, the hook end including a hook;

a central hook arm axis about which the central hook arm is configured to pivot relative to the elongated razor handle body.

2. The razor system of claim 1 wherein the central pushrod is spring mounted in the razor handle elongated body.

3. The razor system of claim 1 wherein the central hook arm is flexible.

4. The razor system of claim 1 wherein the razor handle includes a button mounted at the docking end that actuates the pivot of the central hook arm.

5. The razor system of claim 1 wherein the central hook arm is made of flat metal.

6. The razor system of claim 1 further comprising a cartridge, the cartridge including a generally rectangular frame supporting at least one razor blade, the cartridge frame including a docking portion on a back of the cartridge, the docking portion configured to mate with the one central hook arm and the central pushrod bar.

7. The razor system of claim 6 wherein the docking portion of the cartridge frame includes a ramp and tab, the ramp and tab configured to mate with the central hook arm of the handle.

8. The razor system of claim 7 wherein the cartridge docking portion includes a gap adjacent to the ramp and tab, in which the central hook arm is configured to pivot into the gap, thereby releasing the ramp and tab.

9. The razor system of claim 7 wherein the central ramp and tab includes a fulcrum point at which the central hook arm mates, and about which a force would be imparted on the cartridge when in use, wherein a closest distance between the fulcrum point of the central ramp and tab and a shaving plane across a front of the cartridge is less than 1 mm.

* * * * *